(12) United States Patent
Lee et al.

(10) Patent No.: US 9,065,502 B2
(45) Date of Patent: *Jun. 23, 2015

(54) METHOD AND APPARATUS FOR TRANSMITTING CONTROL INFORMATION IN WLAN SYSTEM

(71) Applicant: LG ELECTRONICS INC., Seoul (KR)

(72) Inventors: Dae Won Lee, Anyang-si (KR); Dong Wook Roh, Anyang-si (KR); Byeong Woo Kang, Anyang-si (KR); Yong Ho Seok, Anyang-si (KR); Yu Jin Noh, Anyang-si (KR); Bong Hoe Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/166,602

(22) Filed: Jan. 28, 2014

(65) Prior Publication Data

US 2014/0140311 A1 May 22, 2014

Related U.S. Application Data

(63) Continuation of application No. 13/320,709, filed as application No. PCT/KR2010/006093 on Sep. 8, 2010, now Pat. No. 8,675,597.

(60) Provisional application No. 61/243,160, filed on Sep.
(Continued)

(30) Foreign Application Priority Data

Mar. 12, 2010 (KR) .................. 10-2010-0022225
Apr. 30, 2010 (KR) .................. 10-2010-0040588
Apr. 30, 2010 (KR) .................. 10-2010-0040589

(51) Int. Cl.
*H04L 5/00* (2006.01)
*H04W 84/12* (2009.01)
(Continued)

(52) U.S. Cl.
CPC ............ *H04B 7/0452* (2013.01); *H04B 7/0671* (2013.01); *H04L 5/0023* (2013.01);
(Continued)

(58) Field of Classification Search
CPC . H04L 5/0023; H04L 5/001; H04L 25/03343; H04L 5/0053; H04L 5/0048; H04L 25/0226; H04W 84/12; H04B 7/0671; H04B 7/0452
USPC .................. 370/329, 330, 336, 337, 338, 343
See application file for complete search history.

(56) References Cited

U.S. PATENT DOCUMENTS 8,077,802 B2 * 12/2011 Sandhu et al. ................ 375/299
8,437,440 B1 5/2013 Zhang et al.
(Continued)

FOREIGN PATENT DOCUMENTS

CN 101194487 A 6/2008
EP 2 056 644 A2 5/2009
(Continued)

OTHER PUBLICATIONS

Huawei, "Downlink control signaling for dual-layer beamforming", 3GPP TSG RAN WG1 meeting #58, Shenzhen, China, Agenda Item 14, Aug. 24-28, 2009, 4 pages, R1-093027.
(Continued)

*Primary Examiner* — Brian D Nguyen
(74) *Attorney, Agent, or Firm* — Birch, Stewart, Kolasch & Birch, LLP

(57) ABSTRACT

There is provided a method of transmitting control information in a Wireless Local Area Network (WLAN) system, comprising transmitting first control information by means of cyclic shift delay diversity beam-forming and transmitting second control information. The first control information comprises information necessary for each of a plurality of target stations of the second control information to receive the second control information. The second control information beamformed and transmitted to the plurality of target stations.

38 Claims, 38 Drawing Sheets

Related U.S. Application Data 17, 2009, provisional application No. 61/259,634, filed on Nov. 9, 2009, provisional application No. 61/303,684, filed on Feb. 12, 2010, provisional application No. 61/307,429, filed on Feb. 23, 2010, provisional application No. 61/349,220, filed on May 28, 2010, provisional application No. 61/240,658, filed on Sep. 9, 2009.

(51) Int. Cl.
| | |
|---|---|
| *H04B 7/04* | (2006.01) |
| *H04B 7/06* | (2006.01) |
| *H04L 25/02* | (2006.01) |
| *H04L 25/03* | (2006.01) |

(52) U.S. Cl.
CPC ............ *H04L5/0048* (2013.01); *H04L 5/0053* (2013.01); *H04L 25/0226* (2013.01); *H04L 25/03343* (2013.01); *H04L 5/001* (2013.01); *H04W 84/12* (2013.01)

(56) References Cited

U.S. PATENT DOCUMENTS

| | | | |
|---|---|---|---|
| 2003/0123470 | A1 | 7/2003 | Kim et al. |
| 2004/0064493 | A1 | 4/2004 | Kulkarni et al. |
| 2005/0120097 | A1 | 6/2005 | Walton et al. |
| 2005/0135284 | A1 | 6/2005 | Nanda et al. |
| 2005/0135318 | A1 | 6/2005 | Walton et al. |
| 2005/0190728 | A1 | 9/2005 | Han et al. |
| 2005/0220058 | A1 | 10/2005 | Garg |
| 2006/0287743 | A1 | 12/2006 | Sampath et al. |
| 2007/0097930 | A1 | 5/2007 | Ouyang et al. |
| 2007/0104089 | A1 | 5/2007 | Mujtaba |
| 2007/0223422 | A1 | 9/2007 | Kim et al. |
| 2008/0080635 | A1 | 4/2008 | Hugl et al. |
| 2008/0225964 | A1 | 9/2008 | Han et al. |
| 2009/0031185 | A1 | 1/2009 | Xhafa et al. |
| 2009/0041148 | A1 | 2/2009 | Li et al. |
| 2009/0154427 | A1* | 6/2009 | Lee et al. ................ 370/335 |
| 2009/0232062 | A1 | 9/2009 | Higuchi et al. |
| 2009/0233556 | A1* | 9/2009 | Xia et al. ................ 455/63.4 |
| 2009/0238297 | A1 | 9/2009 | Zhang et al. |
| 2009/0245153 | A1 | 10/2009 | Li et al. |
| 2009/0268837 | A1 | 10/2009 | Kimura et al. |
| 2009/0291702 | A1 | 11/2009 | Imai et al. |
| 2009/0323849 | A1 | 12/2009 | Bala et al. |
| 2010/0002800 | A1 | 1/2010 | Kim et al. |
| 2010/0046455 | A1 | 2/2010 | Wentink et al. |
| 2010/0046542 | A1* | 2/2010 | Van Zelst et al. ............ 370/465 |
| 2010/0054200 | A1 | 3/2010 | Tsai |
| 2010/0075703 | A1 | 3/2010 | Imai et al. |
| 2010/0284393 | A1* | 11/2010 | Abraham et al. ............. 370/343 |
| 2010/0296591 | A1* | 11/2010 | Xu et al. ................ 375/259 |
| 2010/0329195 | A1 | 12/2010 | Abraham et al. |
| 2010/0329236 | A1 | 12/2010 | Sampath et al. |
| 2011/0002227 | A1* | 1/2011 | Sampath et al. ............. 370/248 |
| 2011/0032875 | A1 | 2/2011 | Erceg et al. |
| 2011/0122971 | A1* | 5/2011 | Kim et al. ................ 375/316 |
| 2012/0093085 | A1 | 4/2012 | Kwon et al. |
| 2012/0269295 | A9 | 10/2012 | Ko et al. |

FOREIGN PATENT DOCUMENTS

| | | |
|---|---|---|
| EP | 2056637 A2 | 5/2009 |
| JP | 2009-219117 A | 9/2009 |
| JP | 2012-504920 A | 2/2012 |
| JP | 2012-523774 A | 10/2012 |
| JP | 2013-502173 A | 1/2013 |
| KR | 10-2003-0014801- | 2/2003 |
| KR | 10-2007-0084289 A | 8/2007 |
| KR | 10-2008-0025153 A | 3/2008 |
| RU | 2332802 C2 | 8/2008 |
| WO | WO 01/72080 A1 | 9/2001 |
| WO | WO 2006/132508 A1 | 12/2006 |
| WO | 2007/111266 A1 | 4/2007 |
| WO | WO 2008/002972 A | 1/2008 |
| WO | WO 2008/015543 A2 | 2/2008 |
| WO | WO 2008/032979 A1 | 3/2008 |
| WO | WO 2008/100093 A1 | 8/2008 |
| WO | WO 2010/042386 A2 | 4/2010 |
| WO | WO 2010/120692 A1 | 10/2010 |
| WO | WO 2011/019968 A1 | 2/2011 |

OTHER PUBLICATIONS

Kim et al., "Bits Consideration for SIGNAL fields", IEEE 802.11-10/0382r2, May 20, 2010, slides 1-22.

Noh et al., "Preamble design aspects for MU-MIMO support", IEEE P802.11-09/1161r0, Nov. 13, 2009, slides 1-20.

Zhang et al., "802.11ac Preamble", IEEE 802.11-10/0070r0, Jan. 18, 2010, slides 1-12.

Xiao et al., "IEEE 802.11N: Enhancements for Higher Throughput in Wireless LANs", IEEE Wireless Communications, Dec. 2005, pp. 82-91.

Gross et al., "Multi-User OFDMA Frame Aggregation for Future Wireless Local Area Networking," In Proc. of IFIP Networking 2009, Aachen, Germany, May 2009, 12 pages.

Lanante et al., "IEEE802.11ac Preamble with Legacy 802.11a/n. Backward Compatibility," IEEE 802.11-yy/0847r0, Jul. 2009, pp. 1-18.

Van Nee et al., "UL MU-MIMO for 11ac," IEEE 802.11-09/0852-00-00ac, Jul. 2009, pp. 1-10

Tu et al., "Proposal for TGac VHT Format", IEEE, IEEE 802.11-09/1258r0, Nov. 19, 2009, 12 pages.

* cited by examiner

METHOD AND APPARATUS FOR TRANSMITTING CONTROL INFORMATION IN WLAN SYSTEM

CROSS REFERENCE TO RELATED APPLICATIONS

This application is a continuation of U.S. application Ser. No. 13/320,709 filed on Nov. 15, 2011, which has been granted as U.S. Pat. No. 8,675,597, and is the National Phase of PCT/KR2010/006093 filed on Sep. 8, 2010, which claims priority under 35 U.S.C. 119(e) to U.S. Provisional Application No.(s) 61/240,658 filed on Sep. 9, 2009, 61/243,160 filed on Sep. 17, 2009, 61/259,634 filed on Nov. 9, 2009, 61/303, 684 filed on Feb. 12, 2010, 61/307,429 filed on Feb. 23, 2010 and 61/349,220 filed on May 28, 2010 and under U.S.C. 119(a) to :Patent Application No.(s) 10-2010-0022225 filed in the Republic of Korea on Mar. 12, 2010, 10-2010-0040589 filed on Apr. 30, 2010 and 10-2010-0040588 filed on Apr. 30, 2010, all of which are hereby expressly incorporated by reference into the present application.

TECHNICAL FIELD

The present invention relates to wireless communication, and more particularly, to a method and apparatus for transmitting control information in a Wireless Local Area Network (WLAN) system supporting multiple antennas.

BACKGROUND ART

With the recent development of information communication technology, a variety of wireless communication techniques are being developed. From among them, a WLAN is a technique which wirelessly enables access to the Internet at home or companies or in a specific service providing area using mobile terminals, such as a Personal Digital Assistant (PDA), a laptop computer, and a Portable Multimedia Player (PMP), on the basis of radio frequency technology.

Since Institute of Electrical and Electronics Engineers (IEEE) 802 (i.e., the standard organization of WLAN technology) has been set up February, 1980, lots of standardization task are being performed.

The initial WLAN technology was able to support the rate of 1 to 2 Mbps through frequency hopping, band spreading, and infrared communication using a 2.4 GHz frequency band in accordance with IEEE 802.11, but recently can support the maximum rate of 54 Mbps using Orthogonal Frequency Division Multiplex (OFDM). In addition, in IEEE 802.11, the standardization of various techniques, such as the improvement of Quality for Service (QoS), Access Point (AP) protocol compatibility, security enhancement, radio resource measurement, wireless access vehicular environment for vehicle environments, fast roaming, a mesh network, interworking with an external network, and wireless network management, is being put to practical use being developed.

IEEE 802.11b from the IEEE 802.11 supports a maximum transmission speed of 11 Mbs while using the 2.4 GHz frequency band. IEEE 802.11a commercialized since the IEEE 802.11b has reduced the influence of interference as compared with the very complicated 2.4 GHz frequency band by using a 5 GHz frequency band not the 2.4 GHz frequency band and also improved the transmission speed up to a maximum of 54 Mbps using the OFDM technique. However, the IEEE 802.11a is disadvantageous in that the transmission distance is shorter than that of the IEEE 802.11b. Further, IEEE 802.11g implements a maximum transmission speed of 54 Mbps using the 2.4 GHz frequency band like the IEEE 802.11b, and it is significantly being in the spotlight because it satisfies backward compatibility. The IEEE 802.11 g is superior to the IEEE 802.11 a even in the transmission distance.

Further, as a technique for overcoming the limit to the transmission speed pointed out as vulnerabilities in the WLAN, there is IEEE 802.11n which has recently been standardized. The IEEE 802.11n has its object to increase the speed and reliability of a network and to expand the operating distance of a wireless network. More particularly, the IEEE 802.11n is configured to support a High Throughput (HT) having a data processing speed of a maximum of 540 Mbps or more and based on a Multiple Inputs and Multiple Outputs (MIMO) technique using multiple antennas on both sides of a transmitter and a receiver in order to minimize transmission error and optimize the data rate. Further, the IEEE 802.11n may use a coding method of transmitting several redundant copies in order to increase the reliability of data and OFDM (Orthogonal Frequency Division Multiplex) in order to increase the speed.

With the wide spread of the WLAN and various applications using the WLAN, a necessity for a new WLAN system for supporting a higher throughput than the data processing speed supported by the IEEE 802.11n is recently gathering strength. A Very High Throughput (VHT) WLAN system is one of IEEE 802.11 WLAN systems which have recently been newly proposed in order to support the data processing speed of 1 Gbps or more. The name of the VHT WLAN system is arbitrary, and a feasibility test for a system using 4×4 MIMO and a channel bandwidth of 80 MHz or more in order to provide the throughput of 1 Gbps or more is being performed.

The VHT WLAN system now being discussed includes two kinds of methods using a frequency band of 6 GHz or less and a frequency band of 60 GHz. If the frequency band of 6 GHz or less is used, a possibility of coexistence with conventional WLAN systems using the frequency band of 6 GHz or less can become problematic.

Meanwhile, the physical (PHY) layer architecture of the IEEE 802.11 consists of a PHY Layer Management Entity (PLME), a Physical Layer Convergence Procedure (PLCP) sublayer, and a Physical Medium Dependent (PMD) sublayer. The PLME functions to manage the physical layer while cooperating with a MAC Layer Management Entity (MLME). The PLCP sublayer functions to transfer a MAC Protocol Data Unit (MPDU), received from the MAC layer, to the PMD sublayer or transfers frames, received from the PMD sublayer, to the MAC layer between the MAC layer and the PMD layer in accordance with an instruction of the MAC layer. The PMD sublayer is a lower layer of the PLCP and it enables the transmission and reception of a physical layer entity between two stations through a radio medium.

The PLCP sublayer attaches additional fields, including information necessary for a physical layer transceiver, to an MPDU in a process of receiving the MPDU from the MAC layer and sending the MPDU to the PMD sublayer. The fields attached in this case can include a PLCP preamble for the MPDU, a PLCP header, tail bits over a data field, and so on. The PLCP preamble functions to have a receiver prepare for a synchronization function and antenna diversity before a PSDU (PLCP Service Data Unit=MPDU) is transmitted. The PLCP header includes information about a frame (e.g., PSDU Length Word (PLW)), information about the data rate of a PSDU portion, and information about header error check.

The PLCP sublayer generates a PLCP Protocol Data Unit (PPDU) by adding the above fields to the MPDU and sends the PPDU to a reception station via a PMD sublayer. The reception station restores data by acquiring the PLCP preamble of the received PPDU and information about data restoration from the PLCP header.

In case where a variety of legacy stations and VHT stations, such as IEEE 802.11 a/b/g/n, coexist, the legacy station cannot recognize or erroneously recognize the PLCP format and thus can malfunction. In order to prevent the above problem, in case where the PLCP format recognizable by the legacy stations and a format for the VHT stations are attached to all transmission data so that the formats can be recognized by all the stations, overhead is increased, thus hindering the efficient use of radio resources. Further, in a WLAN system supporting Multi-User (MU)-MIMO, in case where radio frames are spatially multiplexed for multiple users and transmitted, there is a problem that a station (i.e., not a target of transmission) cannot recognize the radio frames. It is also expected that the amount of control information necessary to send, receive, and decode data will be increased according to the MU-MIMO support.

Consideration is required for a new frame format for a method of transmitting control information in a WLAN system supporting MU-MIMO and for a VHT WLAN system which can accommodate increasing control information, support backward compatibility, and guarantee coexistence with a legacy station.

SUMMARY OF INVENTION

Technical Problem

It is an object of the present invention to provide a method of transmitting control information in a WLAN system supporting MU-MIMO.

It is another object of the present invention to provide a method of accommodating control information and transmitting frames in a WLAN system supporting MU-MIMO.

Technical Solution

In an aspect, a method of transmitting control information in a Wireless Local Area Network (WLAN) system includes transmitting first control information by means of cyclic shift delay diversity beam-forming, and transmitting second control information, wherein the first control information comprises information necessary for each of a plurality of target stations of the second control information to receive the second control information, and the second control information is beamformed and transmitted to the plurality of target stations.

The first control information may further include information about a transmission time taken to transmit spatially multiplexed Spatial Division Multiple Access (SDMA) data to the plurality of target stations.

The second control information may include control information about each of the plurality of target stations.

The control information about each of the plurality of target stations may include at least one of Modulation and Coding Scheme (MCS) information, channel bandwidth information, information about a number of spatial streams, and transmission power information.

The first control information and the second control information may be transmitted through a first frame, and the second control information may include information about a transmission time taken to transmit one or more second frames subsequent to the first frame.

A number of subcarriers per Orthogonal Frequency Division Multiplexing (OFDM) symbol allocated to transmit the first control information may be smaller than a number of subcarriers per OFDM symbol allocated to transmit the second control information.

A number of OFDM symbols allocated to transmit public control information may be greater than a number of OFDM symbols allocated to transmit STA-specific control information.

The first control information and the second control information are applied to different cyclic shifts.

Advantageous Effects

There are provided a control information transmission method and a PLCP frame format which can be applied to a WLAN system supporting MU-MIMO. Further, the coexistence of a VHT station and a legacy station is guaranteed because backward compatibility is supported.

MODE FOR INVENTION

Some embodiments of the present invention are described in detail with reference to the accompanying drawings.

Figure 1:
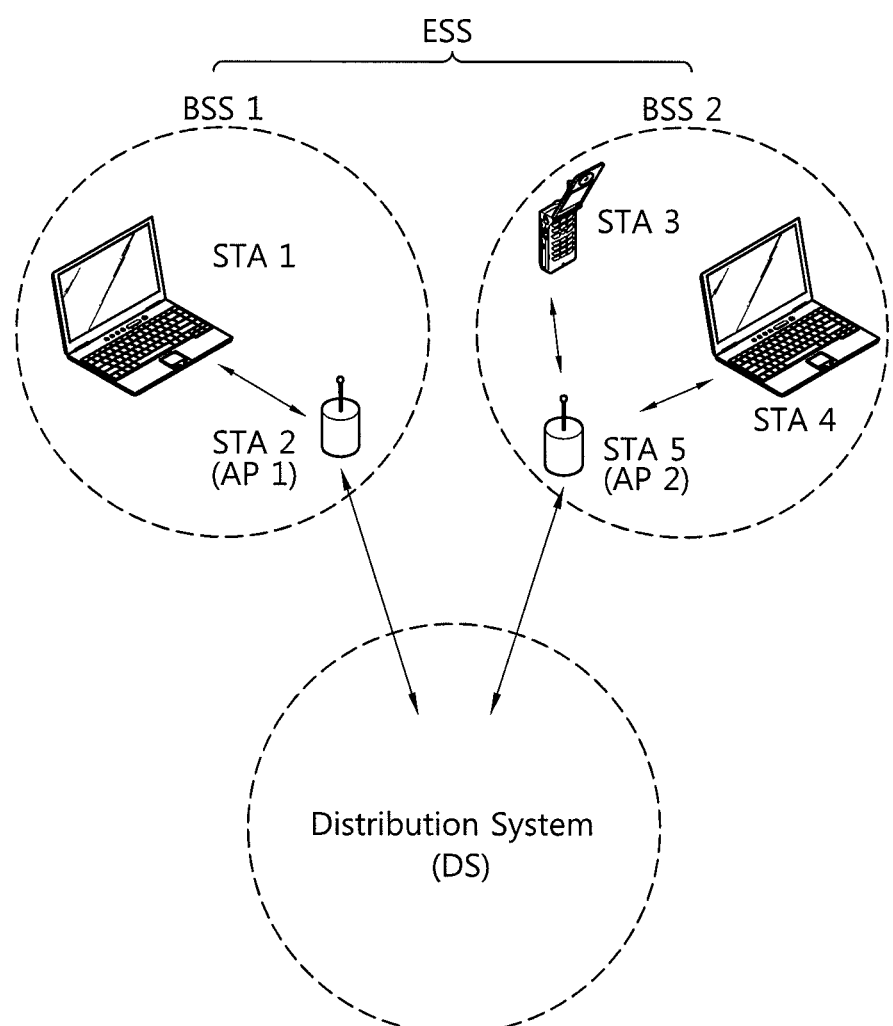
FIG. 1 is a diagram showing an example of a WLAN system to which an embodiment of the present invention can be applied.

FIG. 1 is a diagram showing an example of a WLAN system to which an embodiment of the present invention can be applied.

Referring to FIG. 1, the WLAN system includes one or more Basic Service Sets (BSSs). The BSS is a set of stations (STAs) which are successfully synchronized with other each and can perform transmission reciprocally. The BSS is not a concept indicative of a specific area. Further, a BSS supporting ultra-high data processing of 1 GHz or more in an MAC SAP, such as the WLAN system to which an embodiment of the present invention can be applied, is referred to as a Very High Throughput (VHT) BSS.

The VHT BSS can be classified into an infrastructure BSS and an independent BSS (IBSS). Infrastructure BSSs are shown in FIG. 1. The infrastructure BSSs BSS1 and BSS2 include one or more Non-AP STAs STA 1, STA 3, and STA 4, APs AP 1 (STA 2) and AP 2 (STA 5) (i.e., stations providing distribution service, and a Distribution System (DS) interconnecting the plurality of APs AP 1 and AP 2. In the infrastructure BSS, the AP STA manages the Non-AP STAs of the BSS.

On the other hand, the independent BSS (IBSS) is operated in the ad-hoc mode. The IBSS does not include a centralized management entity because it does not include an AP VHT STA. That is, in the IBSS, Non-AP STAs are managed in a distributed manner. In the IBSS, all STAs can be composed of mobile STAs, and the STAs form a self-contained network because they are not permitted to access a DS.

An STA is a certain function medium, including Medium Access Control (MAC) according to the IEEE 802.11 standards and a physical layer interface for a radio medium. The STA includes both an AP and a Non-AP STA in a broad sense. Further, in a multi-channel environment to be described later, an STA supporting ultra-high data processing of 1 GHz or more is also referred to as a VHT STA. In a VHT WLAN system to which an embodiment of the present invention can be applied, all STAs included in the above BSS may be VHT STAs, or VHT STAs and legacy STAs (e.g., HT STAs according to IEEE 802.11 a/b/g/n) can coexist in the above BSS.

An STA for wireless communication includes a processor and a transceiver and can further include a user interface, display means, and so on. The processor is a function unit designed to generate frames to be transmitted over a wireless network or to process frames received over the wireless network. The processor performs several functions for controlling STAs. Further, the transceiver is functionally coupled to the processor and is a unit designed to transmit and receive frames over a wireless network for STAs.

Portable terminals manipulated by users, from among STAs, are Non-AP STAs STA1, STA3, STA4, and STA5. Assuming that the mobile terminals are simply STAs, they also refer to Non-AP STAs. The Non-AP STA may be referred to as another terminology, such as a terminal, a Wireless Transmit/Receive Unit (WTRU), a User Equipment (UE), a Mobile Station (MS), a mobile terminal, or a Mobile Subscriber Unit. Further, a Non-AP STA supporting ultra-high data processing on the basis of the MU-MIMO technique to be described later is referred to as a Non-AP VHT STA (or simply a VHT STA).

Further, the APs AP1 and AP2 are function entities which provide access to the DS via a radio medium for STAs associated therewith. It is a principle that in an infrastructure BSS including an AP, communication between Non-AP STAs is performed via the AP. However, in case where a direct link is established, such communication can be directly performed between the Non-AP STAs. The AP can be referred to as another terminology, such as a centralized controller, a Base Station (BS), a node-B, a Base Transceiver System (BTS), or a side controller, in addition to an access point. Further, an AP supporting ultra-high data processing on the basis of the MU-MIMO technique to be described later is called a VHT AP.

A plurality of infrastructure BSSs can be interconnected through a Distribution System (DS). The plurality of BSSs interconnected through the DS is called an Extended Service Set (ESS). STAs included in the ESS can communicate with each other. Non-AP STAs within the same ESS can move from one BSS to another BSS while seamlessly communicating with each other.

The DS is a mechanism for allowing one AP to communicate with another AP. In case where an AP sends frames for STAs associated with a BSS managed by the AP or any one STA moves to another BSS, the DS can transfer the frames or transfer the frames over an external network, such as a wired network. The DS needs not to be necessarily a network and can include any type as long as it can provide a certain distribution service defined in the IEEE 802.11. For example, the DS may be a wireless network, such as a mesh network, or a physical structure interconnecting APs.

Meanwhile, a VHT WLAN system uses MU-MIMO so that several STAs can efficiently use wireless channels simultaneously. In other words, the VHT WLAN system allows several STAs to perform transmission and reception to and from an AP at the same time. The AP can send a spatially multiplexed radio frame to several STAs at the same time. To this end, the AP may perform beam-forming by measuring channel situations and may transmit and receive data using a plurality of spatial streams.

Hereinafter, to transmit the multiplexed data to a plurality of STAs is referred to as MU-MIMO transmission or SDMA transmission. In MU-MIMO transmission, at least one spatial stream is allocated to each of the STAs (i.e., targets of transmission), and data can be transmitted using the allocated spatial stream.

Hereinafter, a conventional STA (i.e., Non-VHT STA) is referred to as a legacy STA. The legacy STA includes a Non-HT STA supporting IEEE 802.11 a/b/g standards and an HT STA supporting IEEE 802.11n standards. In various PLCP frame formats proposed by the present invention and described later, fields denoted by the same name, unless specially mentioned, have the same function in the entire specification.

A PLCP frame according to the PLCP frame format proposed by the present invention is generated in the PLCP sublayer of an STA and sent to a transmission target STA using a PLCP frame transmission method, proposed by the present invention, through multiple antennas via a PMD sublayer. Hereinafter, the PLCP frame format and a method of transmitting fields constructing the same, which are described with reference to the accompanying drawings, are examples of various embodiments of the present invention, and the transmission sequence of the fields is not limited to that shown in the drawings. In the following description, the transmission sequence, unless not specially described, can be changed, and some fields can be omitted or added by necessity. The PLCP frame format and the method of transmitting the same to be described later can be adaptively selected and used according to the types and number of STAs constituting a BSS, the amount of data to be transmitted, priority, and so on.

Figure 2:
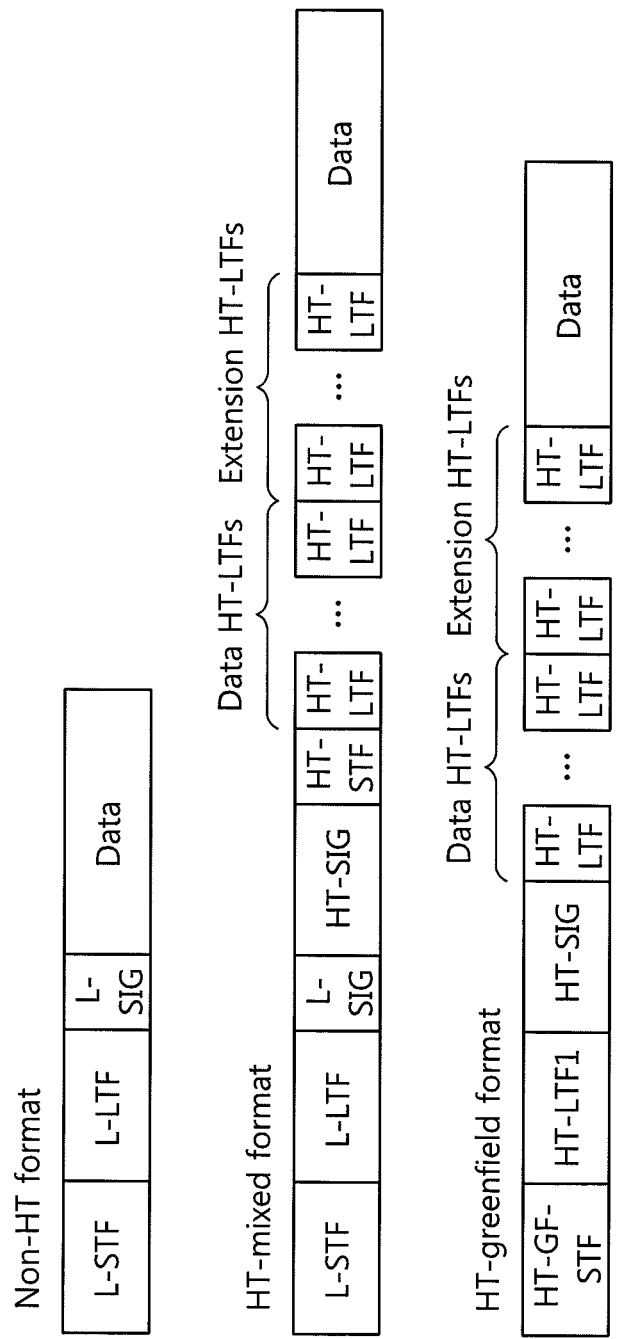
FIG. 2 shows examples of the existing PLCP frame format.

FIG. 2 shows examples of the existing PLCP frame formats. For the PLCP frame formats, reference can be made to sub-clause 20.3 of "Part 11: Wireless LAN Medium Access Control (MAC) and Physical Layer (PHY) specifications; Amendment 5: Enhancements for Higher Throughput" of IEEE 802.11n/D11.0 disclosed June, 2009.

The IEEE 802.11n standards provide three types of Physical Layer Convergence Procedure (PLCP) frames, including a Non-HT format, an HT-mixed format, and an HT-greenfield format. The PLCP frame is used to transmit a PLCP Protocol Data Unit (PPDU).

Elements included in the PLCP frame are listed in the following table.

TABLE 1

| Element | Description |
|---|---|
| L-STF (Non-HT Short Training Field) | Used for frame timing acquisition and automatic gain control (AGC) convergence |
| L-LTF (Non-HT Long Training Field) | Used for channel estimation |

TABLE 1-continued

| Element | Description |
| --- | --- |
| L-SIG (Non-HT SIGNAL field) | Including information for demodulating and decoding data for L-STA |
| HT-SIG (HT SIGNAL field) | Including information for HT-STA to demodulate and decode data |
| HT-STF (HT Short Training Field) | Used for frame timing acquisition and AGC convergence |
| HT-GF-STF (HT-Green Field Short Training Field) | Used for frame timing acquisition and AGC convergence (readable by only HT STA) |
| HT-LTF1 (First HT Long Training Field) | Used for channel estimation |
| HT-LTF (HT Long Training Field) | Including data HT-LTF used for channel estimation for data demodulation for HT-STA and extension HT-LTF used for channel sounding |
| Data field | Including PHY Service Data Unit (PSDU) |

The Non-HT format is used for an L-STA, and it includes an L-STF, an L-LTF, and an L-SIG.

The HT-mixed format is used when an HT-STA and an L-STA coexist. In order to provide an L-STA with backward compatibility, the L-STF, the L-LTF, and the L-SIG are first sequentially. The HT-SIG is used for an HT-STA to decode data.

The HT-greenfield format is used in a system composed of only HT-STAs. That is, a L-STA cannot receive a PLCP frame that follows the HT-greenfield format.

Short Training Fields (STFs), such as the L-STF, the HT-STF, and the HT-GF-STF, are used for frame timing acquisition, AGC (automatic gain control), etc. and thus are also referred to a synchronization signal or a synchronization channel. That is, the STF is used to meet synchronization between STAs or an STA and an AP.

Long Training Fields (LTFs), such as the L-LTF and the HT-LTF, are used for channel estimation for the demodulation of data or control information or both and thus are also referred to a reference signal, a training signal, or a preamble.

The L-SIG and the HT-SIG are referred to as control information because they provide several pieces of information necessary to decode data.

Figure 3:
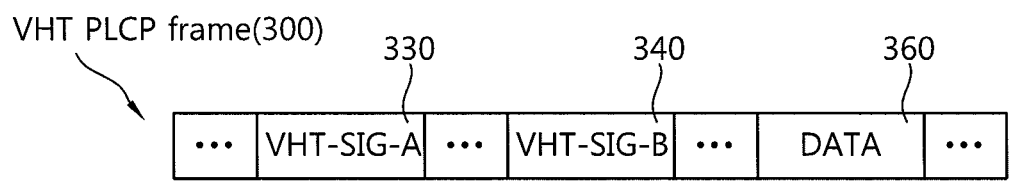
FIG. 3 is a block diagram showing an example of a PLCP frame format according to an embodiment of the present invention.

FIG. 3 is a block diagram showing an example of the PLCP frame format according to an embodiment of the present invention.

A VHT PLCP frame 300 includes a VHTSIG-A field 330, a VHTSIG-B field 340, and a DATA field 360. Each of the VHTSIG-A field 330 and the VHTSIG-B field 340 includes control information which is necessary for a reception STA to demodulate and decode the DATA field 360. The names of the VHTSIG-A field 330 and the VHTSIG-B field 340 are arbitrary and can be represented in various ways by first control information and second control information, respectively, or a first control signal and a second control signal, respectively.

The VHTSIG-A field 330 further includes common information about MU-MIMO transmission of fields to be subsequently transmitted. The VHTSIG-A field 330 can be transmitted so that all STAs within a BSS can receive the VHTSIG-A field 330. The VHTSIG-A field 330 may include information about a target STA of the VHTSIG-B field 340 to be subsequently transmitted and information necessary to receive the VHTSIG-B field 340. The VHTSIG-A field 330 can further include common information in the transmission of data to the target STA. For example, the VHTSIG-A field 330 may include information indicating an SDMA transmission time, together with information about a channel bandwidth used, modulation and coding information, and information about the number of spatial streams used. The SDMA transmission time is the time that Spatial Division Multiple Access (SDMA) data (i.e., a spatially multiplexed data frame for a plurality of STAs) is taken to be transmitted, and it can be referred to as an MU-MIMO transmission time. An STA other than a target of transmission can receive information indicating the SDMA transmission time, set a Network Allocation Vector (NAV) for the corresponding transmission time, and defer channel access.

The VHT-SIG B field 340 includes a parameter value which is used for SDMA transmission every target STA. For example, the VHT-SIG B field 340 may include information about parameter values which may be differently set according to an individual STA, such as an MCS index value indicating a Modulation and Coding Scheme (MCS) used, the bandwidth of a channel, and a value indicating the number of spatial streams.

The DATA field 360 includes SDMA-precoded data which will be transmitted to an STA (i.e., a target of transmission) and may further include tail bits or a bit padding element or both by necessity.

The VHT PLCP frame 300 may further include one or more fields, including information for performing frame timing acquisition and AGC convergence and for selecting diversity and information for channel estimation. The one or more fields may have a format recognizable by a legacy STA and an HT STA or may have the field of a format, recognizable by a legacy STA and an HT STA, added thereto.

A transmission station which transmits the VHT PLCP frame 300 transmits the VHTSIG-A field 330 omni-directionally without SDMA precoding, and applies SDMA precoding and beam-forming to the VHTSIG-B field 340 and the subsequent DATA field 360 and transmits them. In the present invention, transmission of signals omni-directionally may be transmission of signals using time domain cyclic delay diversity beam-forming, where signals transmitted in each transmit antenna are time domain cyclic shifted signals within an OFDM symbol of other transmit antennas.

The STAs of a BSS receive the VHTSIG-A field 330, transmitted omni-directionally, without SDMA precoding. An STA not belonging to targets of transmission can set an NAV during a period indicated by the SDMA transmission time information included in the VHTSIG-A field 330 and defer channel access. An STA belonging to the targets of transmission can acquire information individualized therefore from the VHTSIG-B field 340 and can receive, demodulate, and decode data transmitted thereto.

Figure 4:
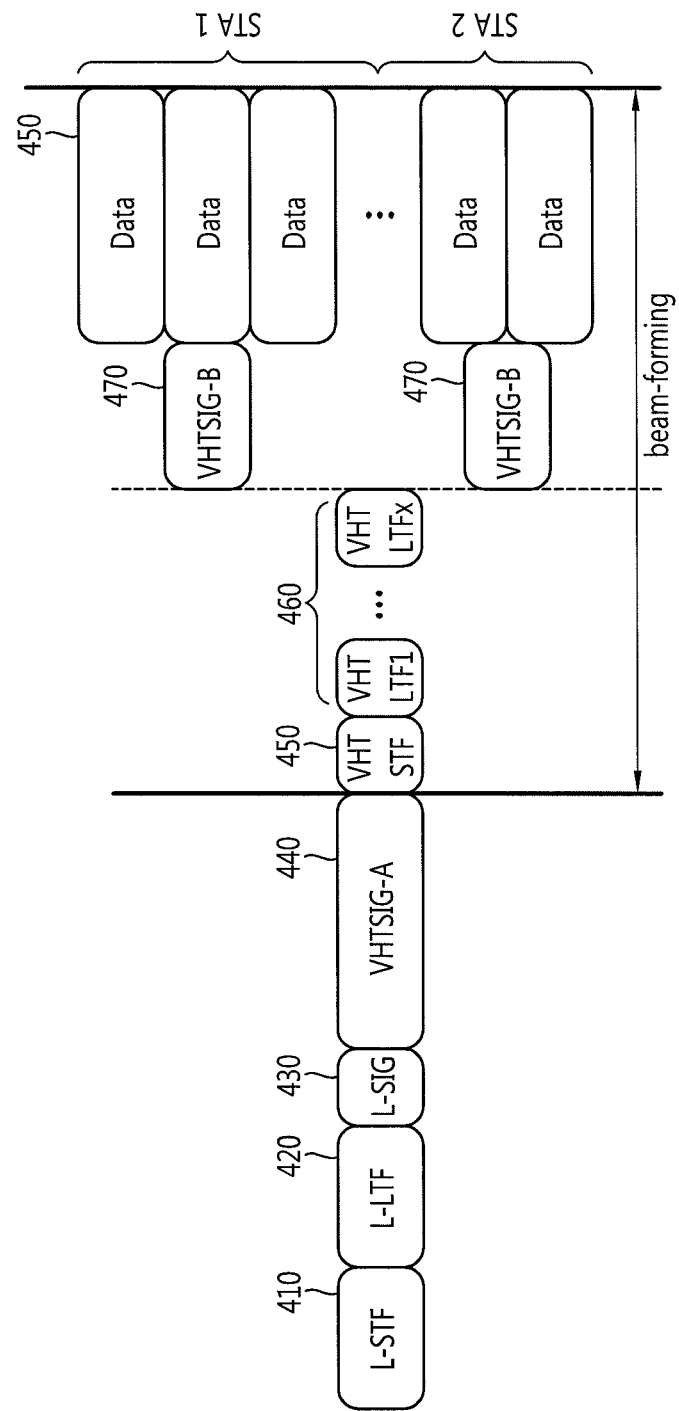
FIG. 4 shows an example of a PLCP frame applied to a VHT system according to the present invention.

FIG. 4 shows an example of a PLCP frame applied to a VHT system according to the present invention.

The PLCP frame includes an L-STF 410, an L-STF 420, an L-SIG 420, VHTSIG-A 440, a VHT-STF 450, VHT-LTFs 460, VHTSIG-Bs 470, and data 480.

The L-STF 410 is used for frame timing acquisition, AGC (automatic gain control) control, coarse frequency acquisition, etc.

The L-LTF 420 is used for channel estimation for demodulating the L-SIG 420 and the VHTSIG-A 440.

The VHT-STF 450 is used for a VHT-STA in order to improve AGC estimation in an MIMO system.

A plurality of the VHT-LTFs 460 is included and used for channel estimation for demodulating the VHTSIG-B 470 and the data 480. The VHT-LTF 460 can also be referred to as a data VHT-LTF. In addition, an extension VHT-LTF for channel sounding can be used.

Beamforming is not applied to the L-STF 410, the L-LTF 420, the L-SIG 430, and the VHTSIG-A 440. Meanwhile, beam-forming for MU-MIMO is applied to the VHT-STF 450, the VHT-LTFs 460, the VHTSIG-Bs 470, and the data 480. In the beam-forming, each field is processed through the same precoding matrix (or precoding vector). Since the data 480 and the VHT-LTFs 460 are processed through the same precoding matrix, a VHT-STA can directly demodulate or decode the data 480 through a channel estimated using the VHT-LTF 460 although it does not know the precoding matrix.

Different cyclic shifts can be applied to a region not subjected to beam-forming and a region subjected to beam-forming, within a PLCP frame. That is, a first cyclic shift can be applied to the L-STF 410, the L-LTF 420, the L-SIG 430, and the VHTSIG-A 440, and a second cyclic shift can be applied to the VHT-STF 450, the VHT-LTFs 460, and the VHTSIG-B 470.

The cyclic shift can be applied to each OFDM symbol. Further, the cyclic shift can be given every transmission chain.

For example, assuming that a cyclic shift amount $T_{cs}$ is applied to a signal s(t) of an interval $0 \le t \le T$, a cyclically shifted signal $s_{cs}(t)$ can be defined as follows.

$$s_{cs}(t; T_{cs}) = \begin{cases} s(t - T_{cs}) & 0 \le t < T + T_{cs} \\ s(t - T_{cs} - T) & T + T_{cs} \le t \le T \end{cases}$$ [Math Figure 1]

Each PSDU included in the data 480 through beam-forming is transmitted to each STA.

For a VHT-STA, two kinds of control information, including the VHTSIG-A 440 and the VHTSIG-Bs 470, are included in the PLCP frame. The VHTSIG-A 440 indicates public control information (or also called first control information) for allowing the VHTSIG-B 470 to be received by each STA. The VHTSIG-B 470 indicates STA-specific control information (or called second control information) for allowing each STA to demodulate or decode or both its own data 480.

The public control information can include at least one of the following fields.

TABLE 2

| Field Name | Description |
| --- | --- |
| SIG-B Length | Indicate the length of VHTSIG-B |
| MU-MIMO Indicator | Indicate whether MU-MIMO is used or can toggle SU-MIMO/MU-MIMO |
| Bandwidth | Indicate the bandwidth of a channel |
| STA Indicator | Indicate an STA which will receive VHTSIG-B. It can indicate the address of an STA or indicate the ID of an STA or the index of VHTSIG-B |
| Number of multiplexings | The number of STAs (users) multiplexed through MU-MIMO |
| Decoding indicator | Indicate information for decoding VHTSIG-B |

The STA-specific control information (or also called user-specific control information) can include at least one of the following fields.

TABLE 3

| Field Name | Description |
| --- | --- |
| MCS | Indicate MCS (modulation and coding scheme) information necessary to decode data |
| STA ID | Indicate an STA which will use MCS |

In Tables 2 and 3, the field names are only illustrative and another name can be used. The fields of Tables 2 and 3 are only illustrative, some of the fields can be omitted, and other fields can be further added the fields.

Figure 5:
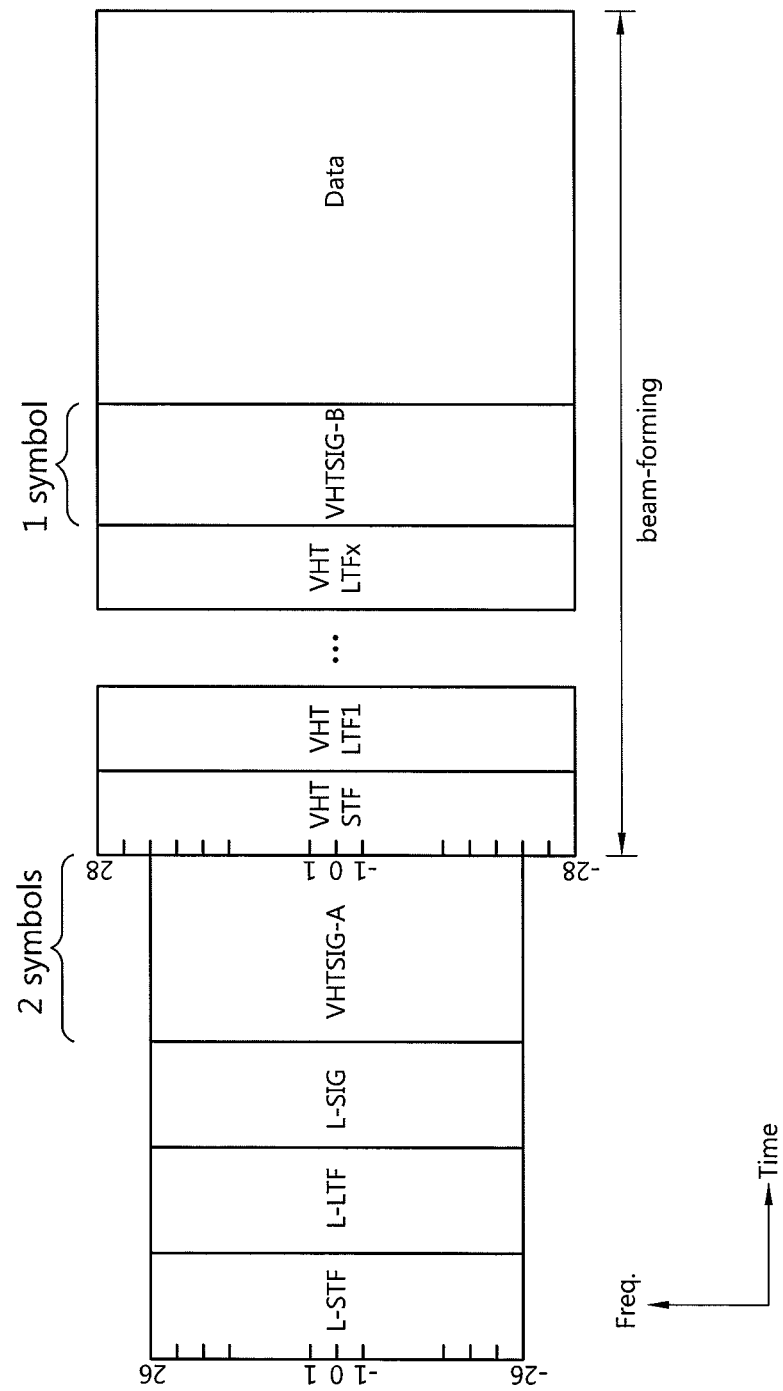
FIG. 5 shows the allocation of resources used to transmit VHTSIG-A and VHTSIG-B.

FIG. 5 shows the allocation of resources used to transmit VHTSIG-A and VHTSIG-B.

Assuming that a bandwidth of 20 MHz is used, an L-STF, an L-LTF, an L-SIG, and VHTSIG-A in which beam-forming is not used uses 52 subcarriers (called narrowband (NB) subcarriers) every OFDM (Orthogonal Frequency Division Multiplexing) symbol in order to support an L-STA. The 52 NB subcarriers can be classified into 48 data NB subcarriers and 4 pilot NB subcarriers.

A VHT-LTF and VHTSIG-B in which beam-forming is used uses same subcarriers of DATA field OFDM symbols, which are 56 subcarriers (called wideband (WB) subcarriers) every OFDM symbol. The 56 WB subcarriers can be classified into 52 data WB subcarriers and 4 pilot WB subcarriers.

An L-STA uses 52 subcarriers every OFDM symbol in a 20 MHz band. In order to provide backward compatibility, the VHTSIG-A uses the same number of subcarriers as the L-STF and the L-LTF.

The L-STF uses Quadrature Phase Shift Keying (QPSK) modulation, and it can be represented by the sequence S of the following frequency domain in one OFDM symbol.

$S_{-26,26}=K\{0,0,1+j,0,0,0,-1-j,0,0,0,1+j,0,0,0,-1-j,0,0,$
$0,-1-j,0,0,0,1+j,0,0,0,0,0,0,0,-1-j,0,0,0,-1-j,0,$
$0,0,1+j,0,0,0,1+j,0,0,0,1+j,0,0,0,1+j,0,0\}$ where K is a QPSK normalization factor and $K=\sqrt{1/2}$. A DC subcarrier is not used.

The L-LTF can be represented by the sequence T of the following frequency domain in one OFDM symbol.

$T_{-26,26}=\{1,1,-1,-1,1,1,-1,1,-1,1,1,1,1,1,1,-1,-1,$
$1,1,-1,1,-1,1,1,1,1,0,1,-1,-1,1,1,-1,1,-1,$
$1,-1,-1,-1,-1,-1,1,1,1,-1,-1,1,1,-1,1,-1,1,1,1,1,1\}$

The L-SIG uses Binary Phase Shift Keying (BPSK) modulation and can have 48 bits because 48 data NB subcarriers are allocated thereto. When the L-SIG has a ½ code rate, the number of information bits of the L-SIG is 24.

The VHTSIG-A also uses BPSK modulation and can have 48 bits every OFDM symbol because 48 data NB subcarriers are allocated thereto. When the VHTSIG-A has a ½ code rate and 2 OFDM symbols allocated thereto, the number of information bits of the VHTSIG-A is 48.

In order to facilitate the detection of the VHTSIG-A, a BPSK constellation for the VHTSIG-A can be rotated around a BPSK constellation for the L-SIG.

Figure 6:
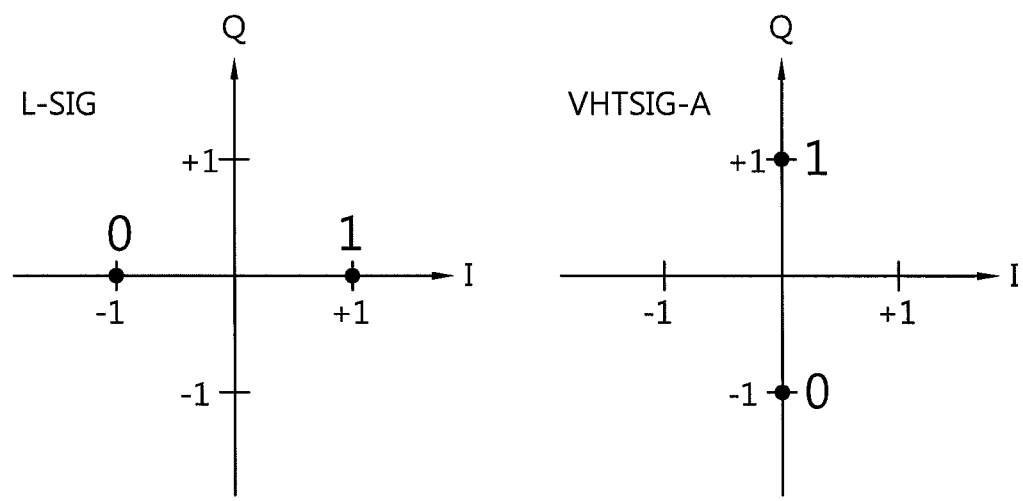
FIG. 6 shows an example of a BPSK constellation for VHTSIG-A.

FIG. 6 shows an example of BPSK constellation for VHTSIG-A.

In FIG. 6, the BPSK constellation for VHTSIG-A has been rotated by 90 degrees around a BPSK constellation for an L-SIG. This is called a rotated constellation. However, this is only illustrative, and the rotation angle can be 45 degrees, 180 degrees, and the like. Further, such rotation can be applied to not only BPSK, but also QPSK, 8-PSK, and 16-QAM.

Referring back to FIG. 4, the VHT-STF, the VHT-LTF, and the VHTSIG-B in which beam-forming is used do not need to maintain compatibility with an L-STA, and use 56 subcarriers every OFDM symbol in order to increase frequency efficiency.

The VHT-STF uses QPSK (Quadrature Phase Shift Keying) modulation and can be defined as the following sequence VHTS in one OFDM symbol.

$VHTS_{-28,28}K\{0,0,0,0,1+j,0,0,0,-1-j,0,0,0,1+j,0,0,$
$0,-1-j,0,0,0,-1-j,0,0,0,1+j,0,0,0,0,0,0,0,-1-j,$
$0,0,0,-1-j,0,0,0,1+j,0,0,0,1+j,0,0,0,1+j,0,0,0,1+j,$
$0,0,0\}$ where K is a QPSK normalization factor and $K=\sqrt{1/2}$.

The VHT-LTF can be represented by the sequence VHTT of the following frequency domain in one OFDM symbol.

$VHTT_{-28,28}$={1,1,1,1,-1,-1,1,1,-1,1,-1,1,1,1,1,1,
    1,-1,-1,1,1,-1,1,-1,1,1,1,1,0,1,-1,-1,1,1,-1,
    1,-1,1,-1,-1,-1,-1,-1,1,1,-1,-1,1,-1,1,-1,1,1,
    1,1,1,-1,-1}

The VHTSIG-B is mapped using the same modulation as the VHTSIG-A (i.e., a rotated BPSK constellation), and it uses one OFDM symbol. The VHTSIG-B uses 52 data subcarriers every OFDM symbol. Accordingly, when the VHTSIG-B has a ½ code rate, the number of information bits of the VHTSIG-B is 26.

In order to support MU-MIMO, control information necessary to decode data is divided into VHTSIG-A and VHTSIG-B. The VHTSIG-A is transmitted in omni-directionally and the VHTSIG-B is transmitted directionally. In other words, for transmission of the VHTSIG-A, channel specific beam-forming is not used (but cyclic delay shifted beam-forming may be used) and for transmission of the VHTSIG-B, beam-forming is used.

The number of subcarriers (e.g., 52) allocated to the VHTSIG-A is smaller than the number of subcarriers (e.g., 56) allocated to the VHTSIG-B. This means that frequency domain resources allocated to the VHTSIG-A are smaller than frequency domain resources allocated to the VHTSIG-B. This is because the VHTSIG-A is decoded using the channel estimation of an L-LTF in order to maintain backward compatibility.

The number of OFDM symbols (e.g., 2) allocated to the VHTSIG-A is greater than the number of OFDM symbols (e.g., 1) allocated to the VHTSIG-B. This means that time domain resources allocated to the VHTSIG-A is greater than time domain resources allocated to the VHTSIG-B. This is because if more STAs are multiplexed using MU-MIMO, only one OFDM symbol can be insufficient to transmit the VHTSIG-A.

When an L-STA and a VHT-STA coexist in a 20 MHz bandwidth, different time resources or different frequency resources or both can be allocated to a region providing backward compatibility and a region not providing backward compatibility. The time and frequency domains supported by all Non-AP STAs and APs within a BSS are allocated to an STF, an LTF, and public control information which are transmitted in the region providing backward compatibility. The time and frequency domains supported by only a VHT-STA or a VHT-AP are allocated to an STF, an LTF, and STA-specific control information in the region not providing backward compatibility. Accordingly, backward compatibility can be guaranteed, and higher frequency efficiency can be provided to a VHT-STA supporting MU-MIMO.

In the above structure, a time domain waveform for 20 MHz VHTSIG-A can be represented by the following equation.

[Math Figure 2]
$$r^{i_{TX}}_{VHTSIG-A}(t) = \frac{1}{\sqrt{N_{TX} \cdot N^{Tone}_{VHTSIG-A}}}$$

$$\sum_{n=0}^{1} w_{T_{SYM}}(t - nT_{SYM}) \cdot \sum_{k=-26}^{26} (\beta_n \cdot D_{k,n} + p_{n+1}P_k)$$

$$\exp(j2\pi k\Delta_F(t - nT_{SYM} - T_{GI} - N^{i_{TX}}_{CS}))$$

i. The $\beta_n$ is phase rotation value such as +1 or +j, where VHTSIG-A modulated symbols are phase rotated to ensure VHT preamble detection. For Wider bandwidths such as 40, 80, or 160 MHz, the time domain waveform of 20 MHz is duplicated in each 20 MHz band frequency of the transmitted signal.

Further, a time domain waveform for the VHTSIG-B can be represented by the following equation.

[Math Figure 3]
$$r^{i_{TX}}_{VHTSIG-B}(t) =$$

$$\frac{1}{\sqrt{N_{STS} \cdot N^{Tone}_{VHTSIG-B}}} \sum_{n=0}^{1} w_{T_{SYM}}(t - nT_{SYM}) \cdot$$

$$\sum_{k=-N_{SR}}^{N_{SR}} \sum_{i_{STS}=1}^{N_{STS}} [Q_k]_{i_{TX},i_{STS}} [P_{VHTLTF}]_{i_{STS},1}$$

$$(D_{k,n} + p_{n+1}P_k)$$

$$\exp(j2\pi k\Delta_F(t - nT_{SYM} - T_{GI} - N^{i_{TX}}_{CS}))$$

$N_{TX}$: the number of transmission chains
$N_{STS}$: the number of space time streams
$N^{i_{TX}}_{CS}$: the cyclic shift of an $i_{TX}$ transmission chain
$N^{i_{STS}}_{CS}$: the cyclic shift of an $i_{STS}$ space time stream
$N^{tone}_{VHTSIG-A}$: the number of subcarriers used in VHTSIG-A
$N^{tone}_{VHTSIG-A}$: the number of subcarriers used in VHTSIG-B
$N_{SR}$: the number of subcarriers in half of the transmitted signal bandwidth used for VHTSIG-B
$\beta_n$: phase rotation value
$T_{SYM}$: symbol duration
$T_{GI}$: guard interval duration
$P_{VHTLTF}$: VHT-LTF mapping matrix
$D_{k,n}, p_n, P_k, Q_k$: parameters given in Paragraph 20.3 of EEE 802.11 n/D11.0

Although not shown in FIG. 4, an HT-SIG can be further included in the PLCP frame. The HT-SIG can be disposed after the L-SIG or the VHTSIG-A. If the HT-SIG is further included, an HT-STF and an HT-LTF can be further included. If a PLCP frame does not provide backward compatibility to an L-STA, the L-STF, the L-LTF, and the L-SIG may not be included. Various PLCP frame formats relating to the above according to embodiments of the present invention are described in detail with reference to block diagrams.

In the above embodiment, although the 20 MHz bandwidth has been described, this is only illustrative. The technical spirit of the present invention can be applied to a bandwidth of 40 MHz or more. Further, the technical spirit of the present invention can be applied to a structure in which a plurality of the 20 MHz bandwidths or the 40 MHz bandwidths is combined together.

In the 40 MHz bandwidth, an L-STF, an L-LTF, an L-SIG, and VHTSIG-A in which beam-forming is not used uses 104 subcarriers every OFDM symbol in order to support an L-STA. VHT-LTF and VHTSIG-B in which beam-forming is used uses 112 subcarriers every OFDM symbol.

In the 40 MHz bandwidth, the L-LTF can be represented by the sequence T of the following frequency domain in one OFDM symbol.

$T_{-58,58}$={1,1,-1,-1,1,1,-1,1,-1,1,1,1,1,1,1,-1,-1,
    1,1,-1,1,-1,1,1,1,1,0,1,-1,-1,1,1,-1,1,-1,
    1,-1,-1,-1,-1,-1,1,1,-1,-1,1,-1,1,-1,1,1,1,1,1,0,
    0,0,0,0,0,0,0,0,0,0,1,1,-1,-1,1,1,-1,1,-1,1,1,1,1,
    1,1,-1,-1,1,1,-1,1,-1,1,1,1,1,0,1,-1,-1,1,1,-1,
    1,-1,1,-1,-1,-1,-1,-1,1,1,-1,-1,1,-1,1,-1,1,1,1,1,
    1,1}

In the 40 MHz bandwidth, the VHT-LTF can be represented by the sequence VHTT of the following frequency domain in one OFDM symbol.

$$VHTT_{-58,58}=\{1,1,-1,-1,1,1,-1,1,-1,1,1,1,1,1,1,-1,-1,\\
1,1,-1,1,-1,1,1,1,1,1,1,-1,-1,1,1,-1,1,-1,1,\\
-1,-1,-1,-1,1,1,-1,-1,1,-1,1,1,-1,-1,1,1,1,1,-1,-1,\\
-1,1,0,0,0,-1,1,1,-1,1,1,-1,-1,1,1,1,31\ 1,1,-1,1,1,\\
1,1,1,1,-1,-1,1,1,-1,1,1,-1,-1,1,1,1,1,1,1,-1,-1,1,1,\\
-1,1,-1,1,-1,-1,-1,-1,1,1,1,-1,-1,1,1,-1,1,-1,1,1,\\
1,1,1\}$$

Figure 7:
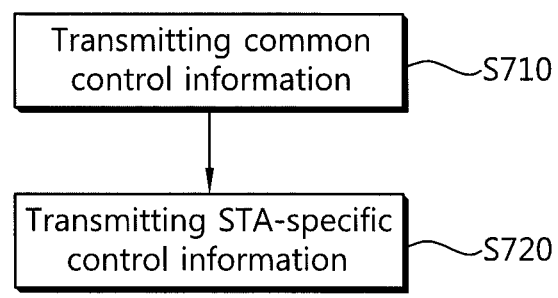
FIG. 7 is a flowchart illustrating a method of transmitting control information according to an embodiment of the present invention.

FIG. 7 is a flowchart illustrating a method of transmitting control information according to an embodiment of the present invention.

An STA or an AP transmits public control information at step S710. The public control information is transmitted omni-directionally without using beam-forming. The public control information is decoded using a channel which is estimated through an L-LTF transmitted in a previous OFDM symbol.

After transmitting the public control information, the STA or the AP transmits STA-specific control information at step S720. The STA-specific control information is transmitted to a specific STA (or a specific user) using beam-forming. A specific STA first receives the public control information, acquires information for receiving STA-specific control information, and then receives the STA-specific control information which has been beamformed and transmitted. The STA-specific control information is decoded using a channel which is estimated through VHT-LTFs transmitted in an OFDM symbol between the public control information and the STA-specific control information.

Since all Non-AP STAs and APs within a BSS must be able to receive the public control information, the time and frequency domains supported by all the Non-AP STAs and APs within the BSS are allocated to the public control information. Meanwhile, since the STA-specific control information is received by only a specific STA or a specific AP, the time/frequency domains supported by the specific STA or the specific AP are allocated to the STA-specific control information. Accordingly, backward compatibility can be guaranteed, and higher frequency efficiency can also be provided to a VHT-STA supporting MU-MIMO.

In the frequency domain, the magnitude of frequency resources of the public control information can be smaller than the magnitude of frequency resources of the STA-specific control information. For example, the number of subcarriers allocated to the public control information may be smaller than the number of subcarriers allocated to the STA-specific control information.

In the time domain, the magnitude of time resources of the public control information may be greater than the magnitude of time resources of the STA-specific control information. For example, the number of OFDM symbols allocated to the public control information may be greater than the number of OFDM symbols allocated to the STA-specific control information.

Different amounts of cyclic shifts may be applied to the public control information and the STA-specific control information.

The method of allocating frequency resources, the modulation method, the transmission method, and the method of applying a cyclic shift in relation to the control information can be applied to various PLCP frame formats likewise, proposed by the present invention.

Figure 8:
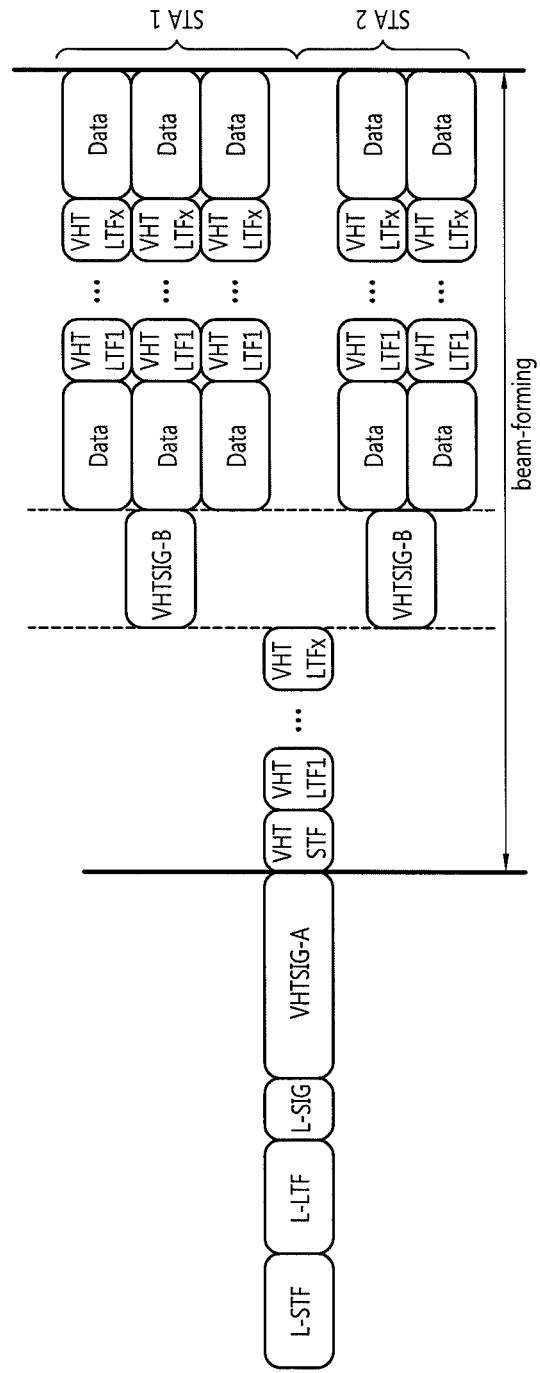
FIGS. 8 to 37 are block diagrams showing examples of a PLCP frame structure and a transmission method according to some embodiments of the present invention.

FIG. 8 shows an example of a PLCP frame structure. FIG. 8 shows a method of adding a middle VTF-LTF to an intermediate part in which data are transmitted in the PLCP frame of FIG. 4.

Although a common WLAN system assumes an indoor environment, a possibility that the common WLAN system will be used in an outdoor environment cannot be excluded. For example, the WLAN can be used in campuses, outdoor parking places, etc. The outdoor environment has a greater change in the channel than the indoor environment.

If the amount of data is much and so the transmission interval of the data is long even though only the Doppler effects are taken into consideration, performance is expected to be deteriorated because there is a possibility that the channel can be changed during the long transmission interval.

Although the data can be divided and transmitted, there may be overhead for STFs and LTFs according to the format of a PCLP frame. Accordingly, the performance of channel estimation can be prevented from being deteriorated even in a change of a channel environment by adding middle VHT-LTFs for the channel estimation in the middle portion of data.

Whether the middle VHT-LTFs will be transmitted can be informed through VHTSIG-A or VHTSIG-B.

Figure 9:
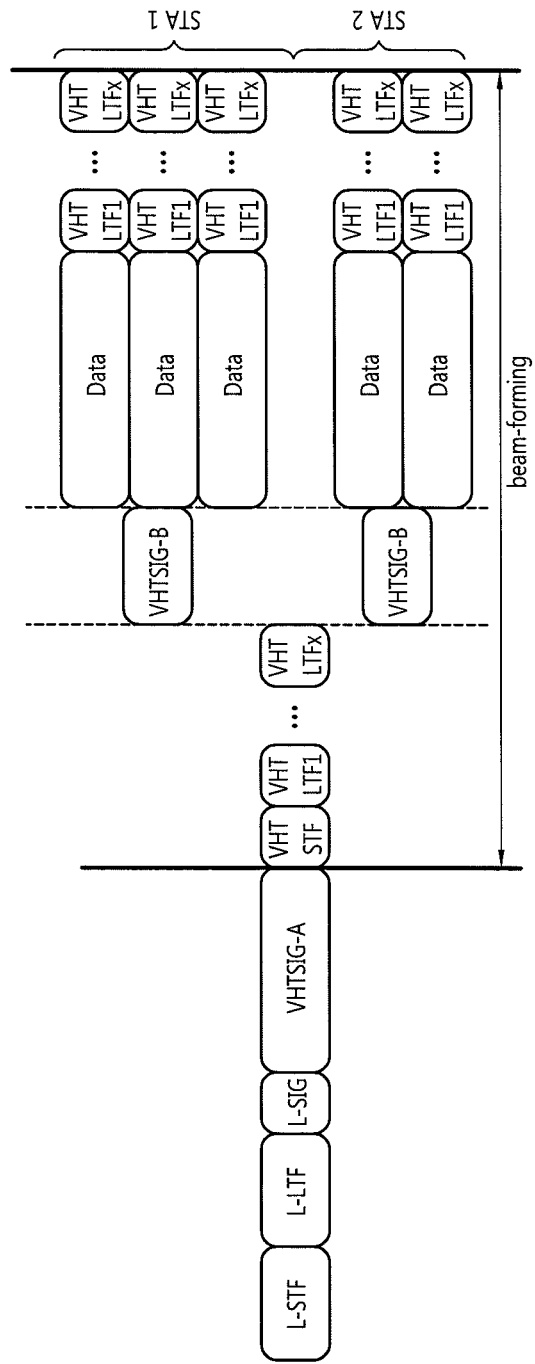

FIG. 9 shows another example of the PLCP frame structure. FIG. 9 proposes a method of adding the last VTF-LTFs to the last of the PLCP frame of FIG. 4.

Figure 10:
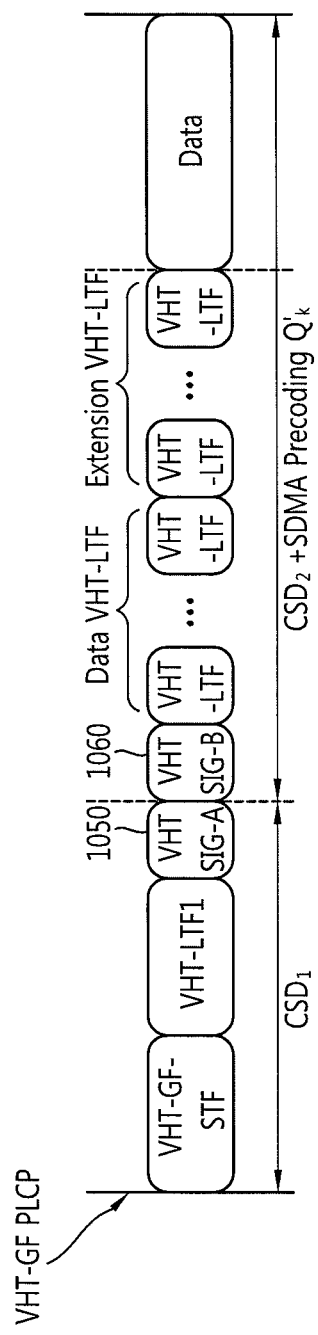

FIG. 10 is a block diagram showing an example of a VHT-GF PLCP frame format proposed by the present invention.

The VHT-GF PLCP frame proposed by the present invention is transmitted in order of a VHT-GF-STF (VHT Green Field Short Training Field), a VHT-LTF1 (VHT Long Training Field 1), and VHTSIG-A 1050. The VHT-GF-STF and the VHT-LTF1 include a control signal for frame timing acquisition, AGC (automatic gain control) convergence, and channel estimation. The VHT-GF-STF, the VHT-LTF1, and the VHTSIG-A 1050 are transmitted omni-directionally. It can be recognized that a channel is being used by receiving the VHT-GF-STF, the VHT-LTF1, and the VHTSIG-A 1050 in which the VHT STAs of a BSS (Basic Service Set) are transmitted omni-directionally.

VHTSIG-B 1060, VHT-LTFs, and a data field which are transmitted after the VHTSIG-A 1050 are subjected to SDMA precoding and beam-forming and then transmitted. The VHTSIG-B 1060, the VHT-LTFs, and the data field can be used to transmit information, individualized every target STA, because they are transmitted to a plurality of the target STAs through MU-MIMO.

FIG. 10 illustrates that a different cyclic shift can be used as cyclic shift CSD1 up to the VHTSIG-A 1050 and as cyclic shift CSD2 after the VHTSIG-A 1050.

Figure 11:
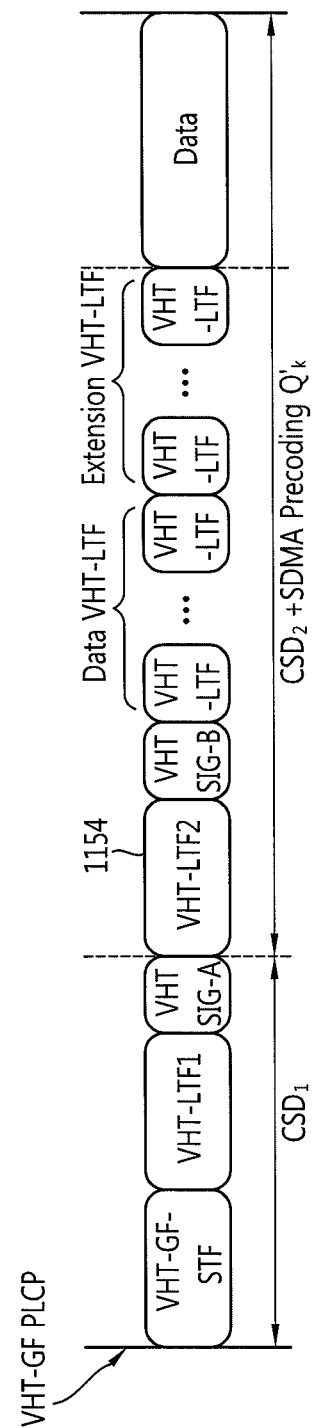

FIG. 11 is a block diagram showing another example of the VHT-GF-PLCP frame format proposed by the present invention.

The VHT-GF-PLCP frame format of FIG. 11 shows an example in which a VHT-LTF2 1154 is further transmitted between the VHTSIG-A and the VHTSIG-B in the VHT-GF-PLCP frame of FIG. 10. The VHT-LTF2 1154 is transmitted anterior to the VHTSIG-B and it thus provides control information to be used for channel estimation which enables a reception STA to receive the VHTSIG-B to be subsequently transmitted.

Figure 12:
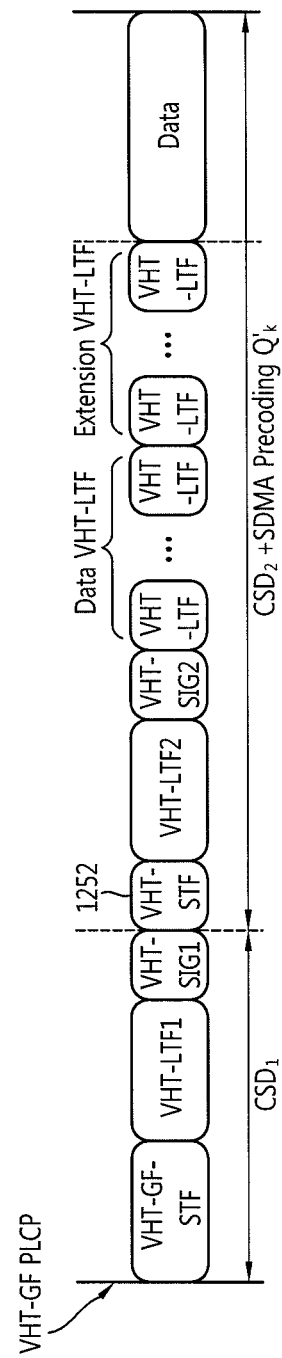

FIG. 12 is a block diagram showing yet another example of the VHT-GF-PLCP frame format proposed by the present invention.

The VHT-GF-PLCP frame format of FIG. 12 shows an example in which a VHT-STF 1252 is further transmitted between the VHTSIG-A and the VHT-LTF2 in the VHT-GF- PLCP frame of FIG. 11. The reason why the VHT-STF 1252 is further transmitted is to transmit a control signal so that a reception STA can properly compensate for transmission power in AGC which can vary according to a change of a transmission method because of omni-directional beam-forming transmission.

Figure 13:
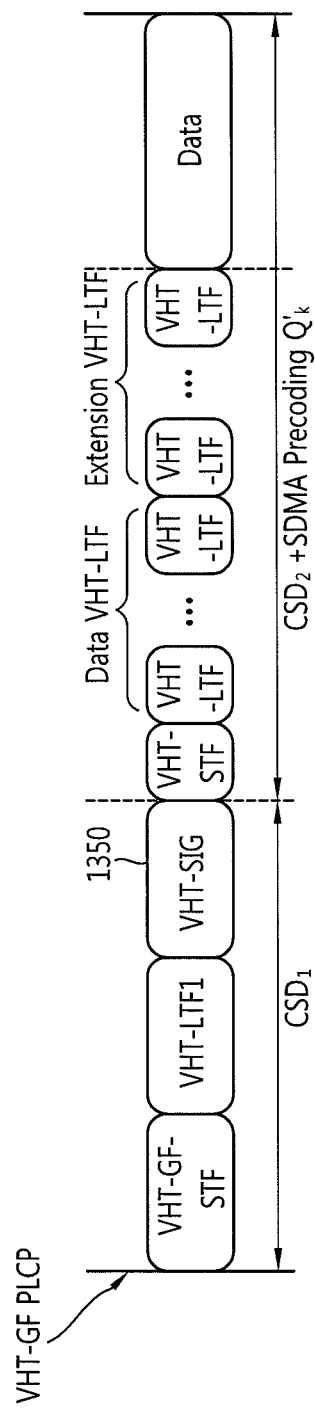

FIG. 13 is a block diagram showing still yet another example of the VHT-GF-PLCP frame format proposed by the present invention.

A VHT-GF-STF, a VHT-LTF1, and one VHTSIG 1350 are transmitted omni-directionally so that they can be received by all the STAs of a BSS. Next, precoding is performed, and a VHT-STF, VHT-LTFs, and a data field are then subjected to beam-forming and transmitted.

Figure 14:
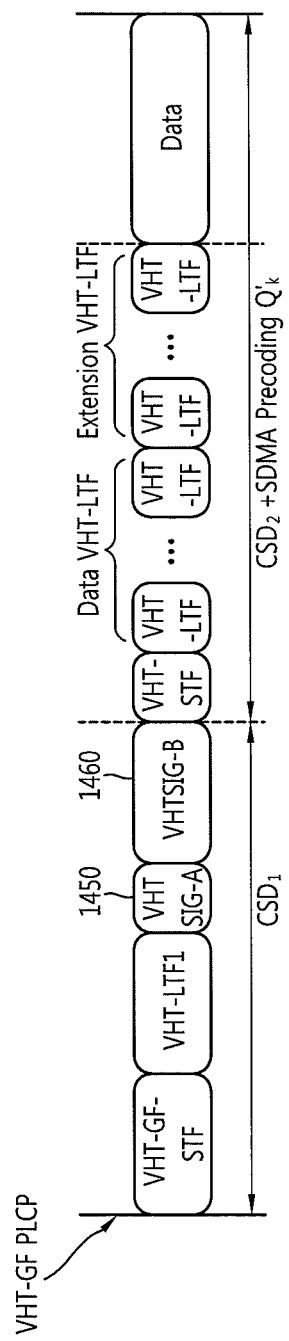

FIG. 14 is a block diagram showing still yet another example of the VHT-GF-PLCP frame format proposed by the present invention.

The VHT-GF-PLCP frame of FIG. 14, like the VHT-GF-PLCP frame of FIG. 13, is used to transmit a VHT-GF-STF, a VHT-LTF1, VHTSIG-A 1450, and VHTSIG-B 1460 omni-directionally so that the VHT-GF-STF, the VHT-LTF1, the VHTSIG-A 1450, and the VHTSIG-B 1460 can be received by all the STAs of a BSS. Next, precoding is performed, and a VHT-STF, VHT-LTFs, and a data field are then subjected to beam-forming and transmitted. In this case, when spatially multiplexed data are transmitted to a plurality of target STAs, the number of streams through MU-MIMO may be variable. Accordingly, control information may also be variable. In the VHT-GF-PLCP frame format of FIG. 14, the VHT-SIG 1350 of FIG. 13 is divided into the VHTSIG-A 1450 and the VHTSIG-B 1460, and the VHTSIG-A 1450 can indicate information about the magnitude of the VHTSIG-B 1460 including control information about each variable target STA.

Figure 15:
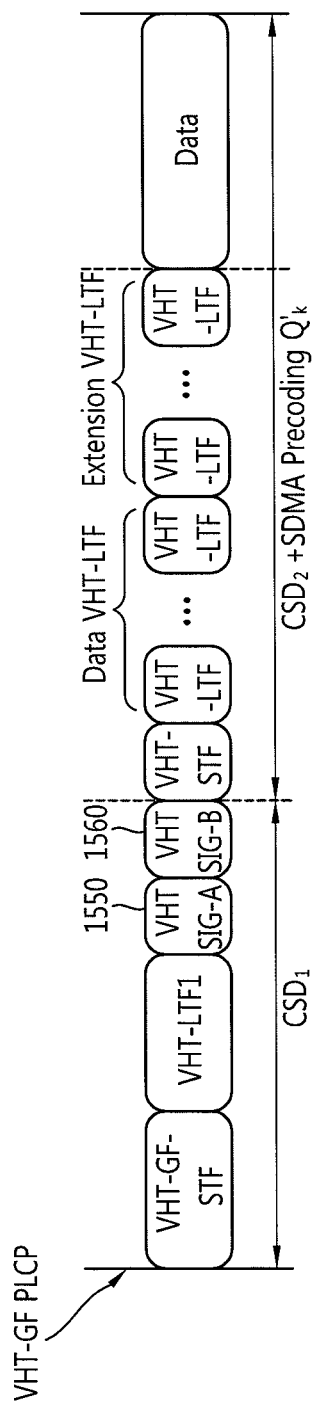

FIG. 15 is a block diagram showing still yet another example of the VHT-GF-PLCP frame format proposed by the present invention.

The VHT-GF-PLCP frame format of FIG. 15 shows an example in which a VHT-GF-STF, a VHT-LTF1, VHTSIG-A, and VHTSIG-B are transmitted omni-directionally, and then a VHT-STF, VHT-LTFs, and a data field are then subjected to precoded, beam-forming, and then transmitted. Unlike the VHT-GF-PLCP frames of FIGS. 10 to 14 in which MU-MIMO transmission is performed, the VHT-GF-PLCP frame of FIG. 15 shows an example of a PLCP frame in which SU-MIMO transmission is performed. The reason why both VHT-SIGs (i.e., the VHTSIG-A and the VHTSIG-B) are transmitted omni-directionally is that there is no problem of collision and interference between PLCP frames toward different STAs because SDMA transmission is not performed unlike MU-MIMO transmission.

The VHTSIG-A 1550 and the VHTSIG-B 1560 can include an indicator, indicating whether the VHT-GF-PLCP frame is the VHT-GF-PLCP frame of MU-MIMO or the VHT-GF-PLCP frame of SU-MIMO, in the form of a sub-field. For example, in case where a type subfield, including information indicative of the type of a VHT-GF-PLCP frame, is set to 0 and transmitted, a reception STA can recognize the indicator as a SU-MIMO VHT-GF-PLCP frame. Further, in case where the type subfield is set to 1 and transmitted, the reception STA can recognize the indicator as an MU-MIMO VHT-GF-PLCP frame.

A VHT-STF including a control signal for compensation in AGC according to a change of a transmission method is transmitted after the VHTSIG-B 1560. Fields posterior to the VHT-STF are subjected to precoding and beam-forming and then transmitted.

Figure 16:
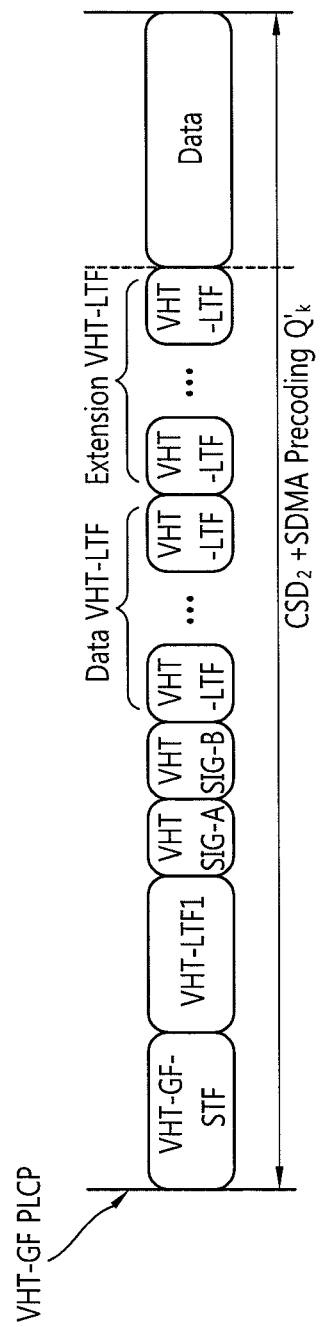

FIG. 16 is a block diagram showing still yet another example of the VHT-GF-PLCP frame format proposed by the present invention.

The VHT-GF-PLCP frame format of FIG. 16 may be used in case where even VHTSIG-A needs not to be transmitted to other STAs of a BSS using a VHT-GF-PLCP frame format which can be used in SU-MIMO. Unlike in the example of FIG. 15, in the VHT-GF-PLCP frame of FIG. 16, all the fields are subjected to SDMA precoding and transmitted. Since there is no change of a transmission method in the transmission of the frame, the VHT-STF may be omitted unlike the PLCP frame format of FIG. 15.

Figure 17:
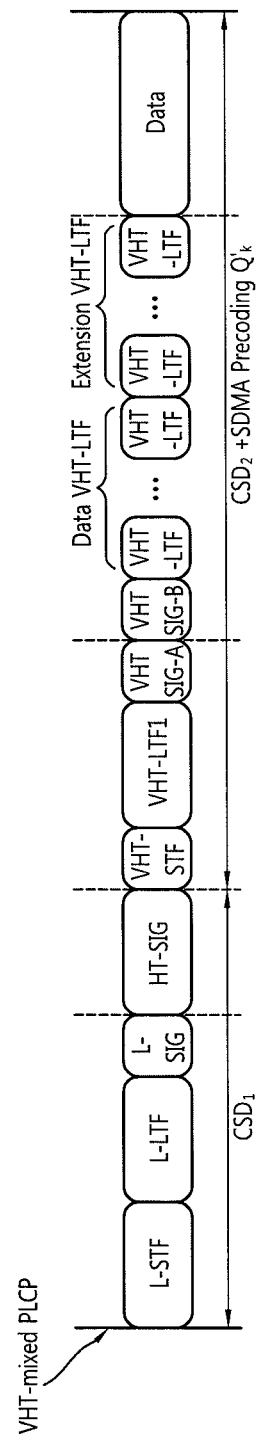

FIG. 17 is a block diagram showing an example of a VHT-mixed PLCP frame format proposed by the present invention.

The VHT-mixed PLCP frame proposed by the present invention includes a training field and a signal (SIG) field for legacy STAs. The training field and the signal field for legacy STAs are transmitted anterior to a training field and a signal field for VHT STAs so that the legacy STAs can know that a channel is being used by receiving the training field and the signal field for legacy STAs.

Referring to FIG. 17, an L-STF (legacy short training field) ad an L-LTF (legacy long training field) (i.e., training fields for legacy STAs) are first transmitted. The L-STF is used for frame timing acquisition and AGC (automatic gain control) convergence, and the L-LTF is used for a signal field (SIG field) and channel estimation for data demodulation.

The signal field is transmitted posterior to the training fields. Here, an L-SIG for a Non-HT STA and an HT-SIG for an HT STA may be transmitted. The HT-SIG, as in the example of FIG. 10, may be transmitted in the form of one field posterior to the L-SIG or may be included in the L-SIG and then transmitted as needed. The L-SIG and the HT-SIG includes Modulation and Coding Scheme (MCS) information necessary to demodulate and decode the data field subsequently transmitted.

The training fields and the signal field for legacy STAs are first transmitted and the fields for VHT STAs are then transmitted. The fields for VHT STAs may include a VHT-STF, a VHT-LTF1, VHT-SIG, VHT-LTFs for channel estimation with individual STAs, and extension VHT-LTFs. After the training fields and the signal field for VHT STAs are transmitted, a data field is transmitted.

In the example of FIG. 17, the training fields and the signal field for legacy STAs are subjected to only CSD (cyclic shift delay) without precoding so that they can be recognized by the legacy STAs and then transmitted omni-directionally. The CSD may be performed before or after Inverse Discrete Fourier Transform (IDFT) in a signal transmission process in order to prevent unwanted beam-forming from being generated. The CSD may be performed every transmitter chain or every spatial stream and may be applied as part of a spatial mapper. Next, the training fields, the signal field, and the data field for VHT STAs may be subjected to CSD, precoding, and beam-forming and then transmitted.

Figure 18:
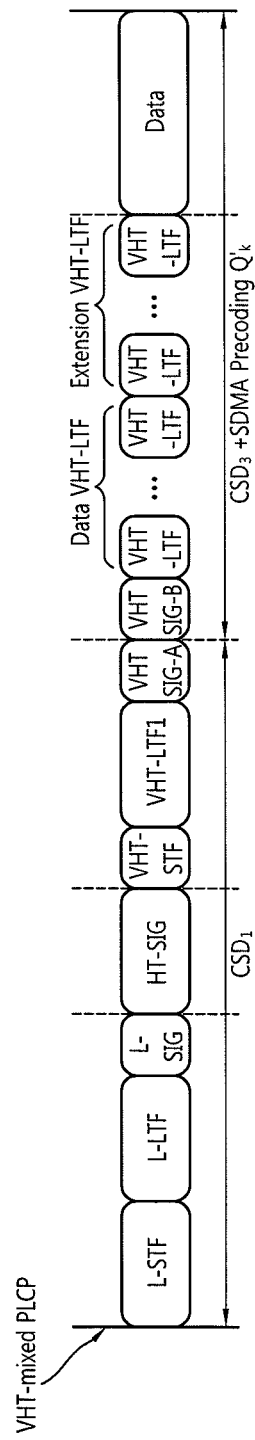
Figure 19:
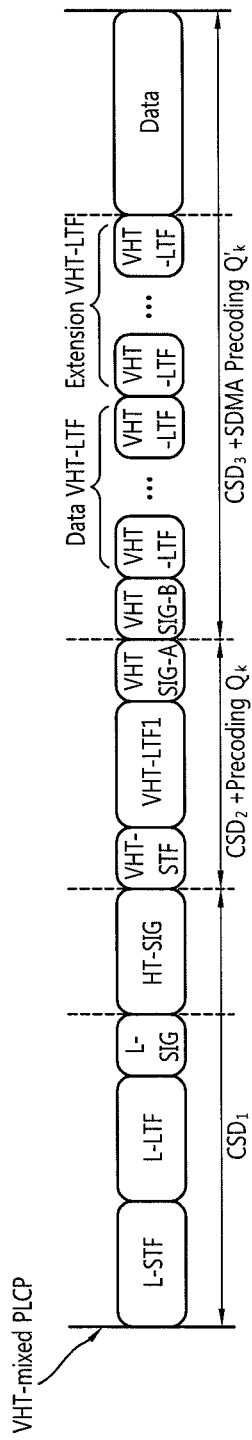

FIGS. 18 and 19 are block diagrams showing another example of the VHT-mixed PLCP frame format proposed by the present invention.

The VHT-mixed PLCP frame of FIGS. 18 and 19 have the same field and transmission sequence as the PLCP frame of FIG. 8. However, the VHT-mixed PLCP frame of FIG. 18 differs from the VHT-mixed PLCP frame of FIG. 8 in that fields up to VHTSIG-A are omni-directionally and fields starting from VHTSIG-B are subjected to SDMA precoding and transmitted. The VHT-mixed PLCP frame of FIG. 19 differs from the VHT-mixed PLCP frame of FIG. 18 in that fields from a VHT-STF to VHTSIG-A are precoded and transmitted.

Figure 20:
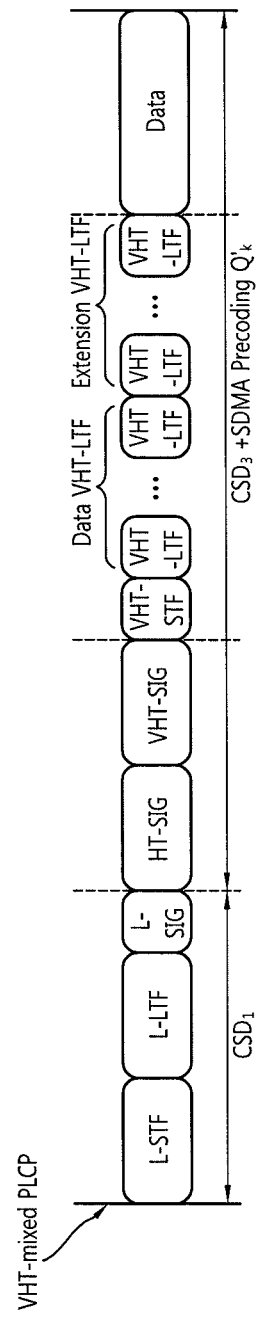

FIG. 20 is a block diagram showing yet another example of the VHT-mixed PLCP frame format proposed by the present invention.

Referring to FIG. 20, training fields and a signal field for legacy STAs and a signal field VHT-SIG for VHT STAs are transmitted omni-directionally. Next, a field VHT-STF to a data field are subjected to SDMA precoding and transmitted. Here, the VHT-SIG field includes control information for demodulating and decoding data received by reception STAs.

Figure 21:
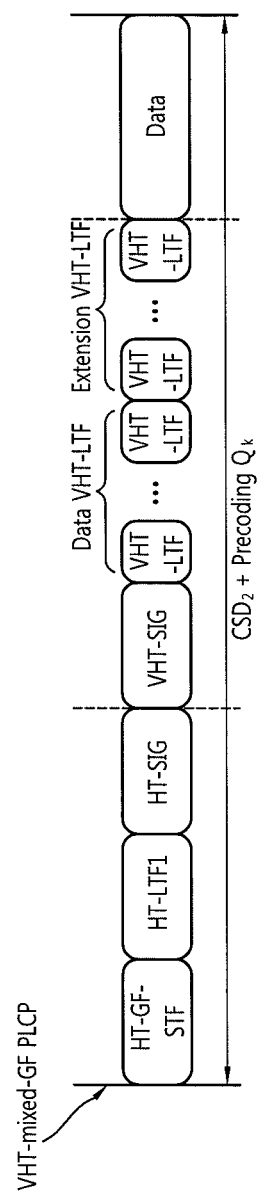

FIG. 21 is a block diagram showing an example of a VHT-mixed-GF PLCP frame format proposed by the present invention.

The VHT-mixed-GF PLCP format of FIG. 21 is effective in the case of a WLAN system composed of only IEEE 802.11n HT STAs and VHT STAs or in case where Non-HT STAs need not to be taken into consideration. In the VHT-mixed-GF PLCP frame, an L-STF, an L-LTF, and an L-SIG are not transmitted because Non-HT STAs need not to be taken into consideration. However, an HT-GF-STF, an HT-LTF1, and an HT-SIG are first transmitted so that HT STAs can recognize the PLCP frame. Next, a VHTSIG and VHT-LTFs for VHT STAs and a data field are transmitted.

In the VHT-mixed-GF PLCP frame of FIG. 21, the VHT-LTFs and the data field are transmitted immediately after the HT-SIG and the VHT-SIG without a VHT-STF because all fields are precoded and a precoded value is applied to all the fields.

Figure 22:
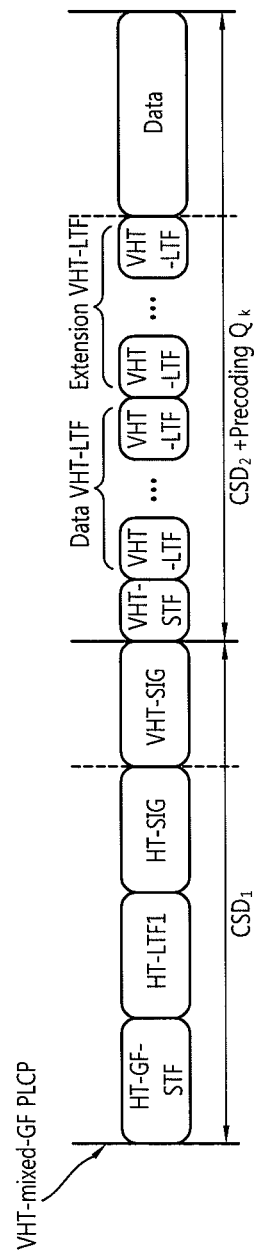

FIG. 22 is a block diagram showing another example of a VHT-mixed-GF PLCP frame format proposed by the present invention.

Unlike in the example of FIG. 21, fields up to a VHT-SIG are transmitted omni-directionally so that all HT STAs and VHT STAs within a BSS can receive an HT-SIG and the VHT-SIG. Fields subsequent to the VHT-SIG are precoded and transmitted. That is, a VHT-STF is first transmitted, and VHT-LTFs and a data frame are then transmitted.

Figure 23:
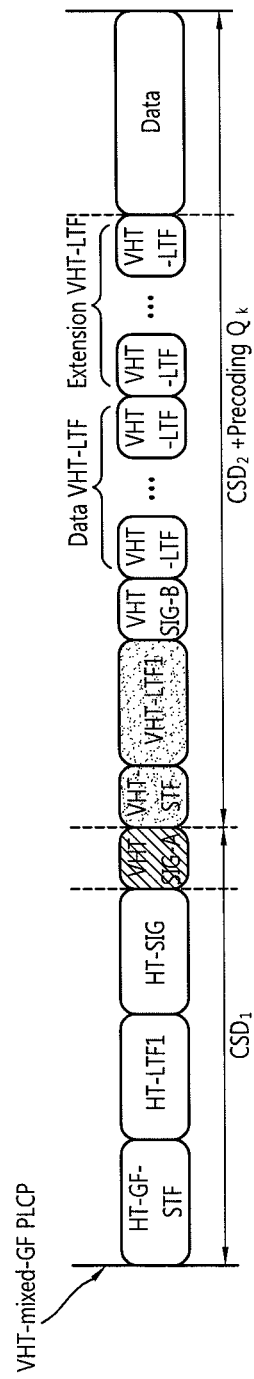

FIG. 23 is a block diagram showing yet another example of a VHT-mixed-GF PLCP frame format proposed by the present invention.

In the VHT-mixed-GF PLCP frame of FIG. 23, an HT-GF-STF, an HT-LTF1, an HT-SIG, and VHTSIG-A are transmitted omni-directionally, and all subsequent fields are precoded and sequentially transmitted in order of a VHT-STF, a VHT-LTF1, VHTSIG-B, VHT-LTFs, and a data field. Here, the VHTSIG-A may not be additionally transmitted, and parameters for data demodulation and decoding may be transmitted in the VHTSIG-B. In this case, information of a subfield transmitted in the HT-SIG may be reused. A reception STA can demodulate and decode the data field on the basis of the information of the VHTSIG-B. Further, some of the fields of the PLCP frame format of FIG. 23 may be omitted as needed, and FIGS. 24 and 25 show an example thereof.

Figure 24:
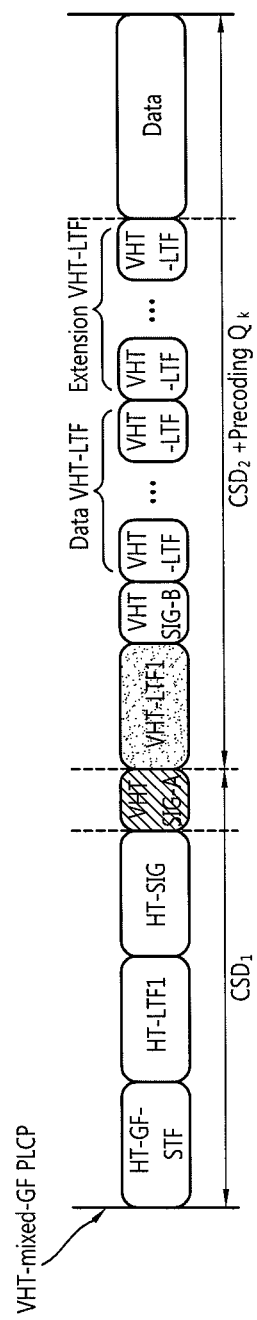
Figure 25:
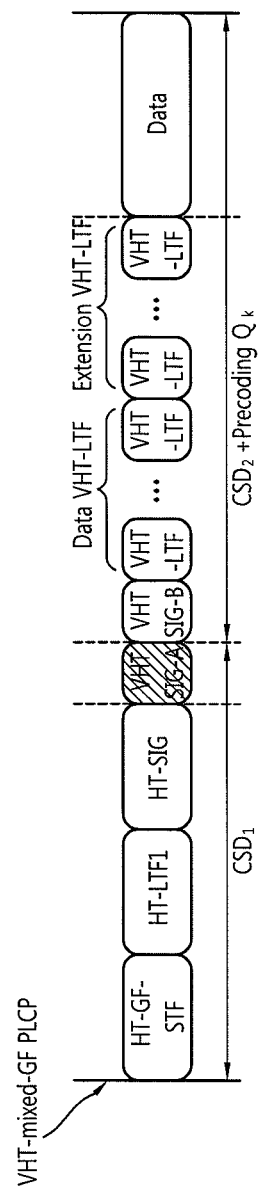

FIGS. 24 and 25 show formats in each of which the VHT-STF or the VHT-LTF1 is omitted in the example of FIG. 23 and show examples of the VHT-mixed-GF PLCP frame format which may be modified according to the implementation of an STA.

Figure 26:
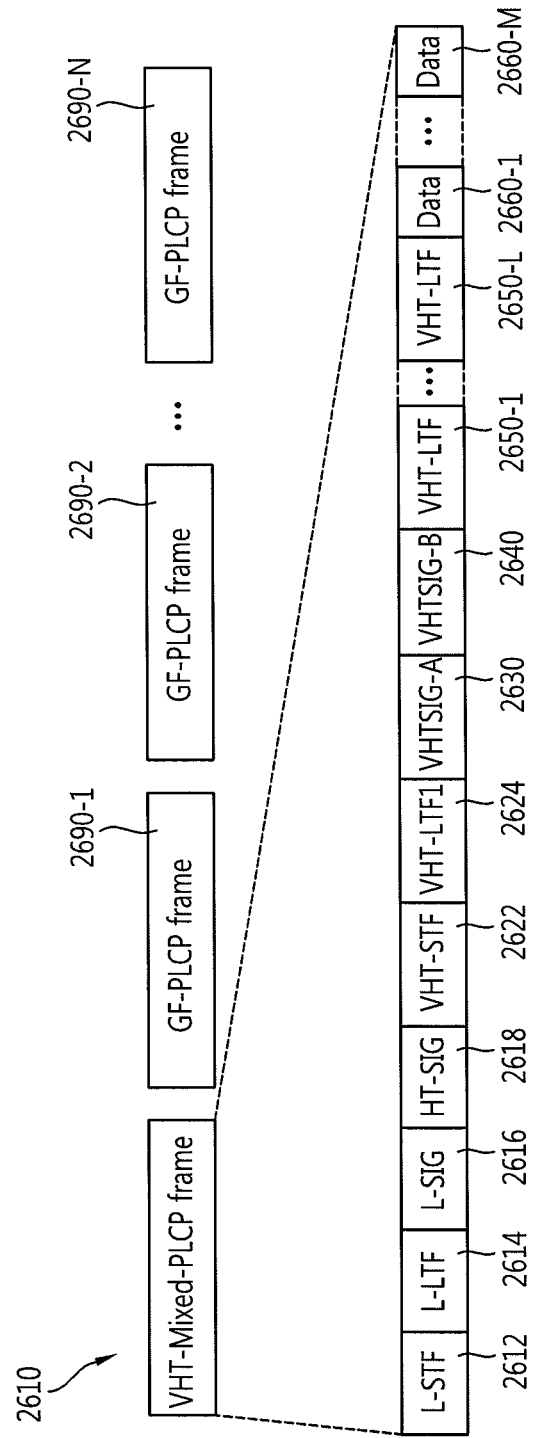

FIG. 26 shows an example of a VHT-Mixed-PLCP frame format and the transmission of the VHT-Mixed-PLCP frame according to an embodiment of the present invention.

The VHT-Mixed-PLCP frame 2610 includes TFs (training fields) and SIGs (recognizable by legacy STAs) for the legacy STAs, TFs and SIGs for VHT STAs, and a data field. As an example of the TFs and the SIGs for legacy STAs, the VHT-Mixed-PLCP frame 2610 of FIG. 26 includes an L-STF (Non-HT short Training Field) 2612, an L-LTF (Non-HT Long Training Field) 2614, an L-SIG (Non-HT SIGNAL Field) 2616, and an HT-SIG (HT SIGNAL field) 2618.

The L-STF 2612 is used for frame timing acquisition and AGC (automatic gain control) convergence. The L-LTF 2614 is used for channel estimation for demodulating the L-SIG 2616 and data. The L-SIG 2616 includes information for demodulating and decoding subsequent data. The HT-SIG 2618 is a SIG field for an HT STA and may be included in the L-SIG 2616 and transmitted. The L-STF 2612, the L-LTF 2614, and the L-SIG 2616 are transmitted anterior to other fields so that legacy STAs can recognize them and can know that a channel is being used.

The VHT-Mixed-PLCP frame 2610 according to the embodiment of the present invention includes a VHT-STF 2622 for VHT STAs, a VHT-LTF1 2624, two VHT-SIGs (i.e., VHTSIG-A 2630 and VHTSIG-B 2640), and VHT-LTFs 2650-1, ..., 2650-L. The VHTSIG-A 2630 includes common information about fields subsequently transmitted and the PLCP frame. The VHTSIG-B 2640 may include information individualized every target STA to which data will be transmitted.

In a method of transmitting frames according to an embodiment of the present invention, the VHT-Mixed-PLCP frame 2610 is first transmitted, and N number of GF-PLCP frames 2690-1 to 2690-N are then transmitted. The VHT-Mixed-PLCP frame 2610 includes transmission time information about the VHT-Mixed-PLCP frame 2610 and N number of the VHT GF-PLCP frames 2690-1 to 2690-N. Legacy STAs and VHT STAs which are not transmission target STAs can know that a channel is being used through the VHT-Mixed-PLCP frame 2610 and sets an NAV and defers channel access during the time for which the channel is used on the basis of the transmission time information included in the VHT-Mixed-PLCP frame 2610. To this end, fields before the VHTSIG-A 2630 in the VHT-Mixed-PLCP frame 2610 are transmitted without SDMA precoding so that they can be recognized by all STAs including legacy STAs, and only fields subsequent to the VHTSIG-A 2630 are subjected to SDMA precoding and transmitted.

Legacy STAs and VHT STAs which are not transmission target STAs may not recognize N number of the GF-PLCP frames 2690-1 to 2690-N transmitted after the VHT-Mixed-PLCP frame 2610, but may set an NAV and defer channel access during the time for which all the VHT-Mixed-PLCP frame 2610 and N number of the GF-PLCP frames 2690-1 to 2690-N are transmitted on the basis of the transmission duration information included in the VHT-Mixed-PLCP frame 2610. Accordingly, malfunction can be prevented.

Figure 27:
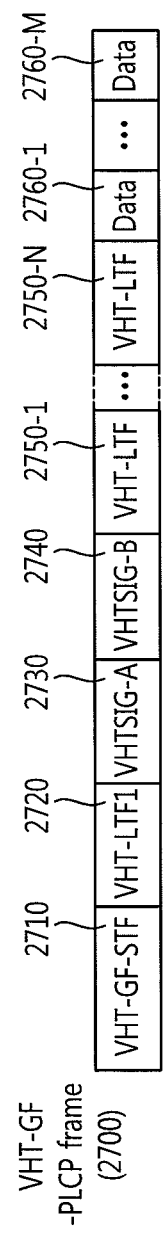

FIG. 27 is a block diagram showing a VHT-GF-PLCP frame format according to an embodiment of the present invention.

The VHT-GF-PLCP frame 2700 includes a VHT-GF-STF 2710, a VHT-LTF1 2720, two VHT-SIG fields (i.e., VHTSIG-A 2730 and VHTSIG-B 2740), N number of VHT-LTFs 2750-1, ..., 2750-N, and a data field DATA. In the example of FIG. 27, the VHTSIG-A 2730 and the VHTSIG-B 2740 are consecutively transmitted, but only illustrative. The VHTSIG-B 2740 may be transmitted immediately after the VHTSIG-A 2730 or may be transmitted after the VHTSIG-A 2730. In the VHT-GF-PLCP frame 2700 according to the present invention, the VHT-GF-STF 2710, the VHT-LTF1 2720, and the VHTSIG-A 2730 are transmitted omni-directionally so that all VHT STAs can listen to them. The VHTSIG-B 2740 and data subsequently transmitted can be subjected to SDMA precoding and beam-forming and then transmitted. The VHTSIG-A 2730 includes common information about subsequent SDMA transmission. For example, the VHTSIG-A 2730 may include common information about SDMA transmission duration so that third STAs (i.e., not transmission target STAs) may set an NAV during the SDMA transmission duration. The VHTSIG-B 2740 has a parameter value set therein or includes the parameter value which is used for SDMA transmission to each transmission target STA. For example, an MCS index, a channel bandwidth, the number of spatial streams, and so on may be set and included in the VHTSIG-B 2740 on an STA basis and then transmitted.

The VHTSIG-B 2740 and the data subsequently transmitted are subjected to SDMA precoding and beam-forming and then transmitted. Accordingly, a third STA (i.e., not a transmission target STA) does not receive the VHTSIG-B 2740 field and the data subsequently transmitted, but can recognize a corresponding preamble by receiving the fields up to the VHTSIG1 2730.

In Single User (SU)-MIMO, a GF-PLCP frame may use one VHTSIG. This is because since SDMA transmission is not performed in the SU-MIMO, problems, such as collision and interference between PLCP frames heading for different STAs, are not generated. In order to identify GF-PLCP frames in the SU-MIMO and the MU-MIMO, a type subfield indicative of a transmission type may be included in the VHTSIG-A 2730 and the VHTSIG-B 2740. In case where a configuration value of the type subfield indicates transmission using the SU-MIMO method, only one VHTSIG field is used. In case where a configuration value of the type subfield indicates transmission using the MU-MIMO method, two VHTSIGs (i.e., VHTSIG1 and VHTSIG2) are used. As described above, the VHTSIG1 of the two VHTSIGs is used to detect and recognize the preamble of a PLCP frame which is omnidirectionally transmitted and being transmitted by STAs within a BSS. Further, the VHTSIG2 of the two VHTSIGs has information about MCS index values for spatial streams heading for respective transmission target STAs, a channel bandwidth, the number of spatial streams, etc.

Figure 28:
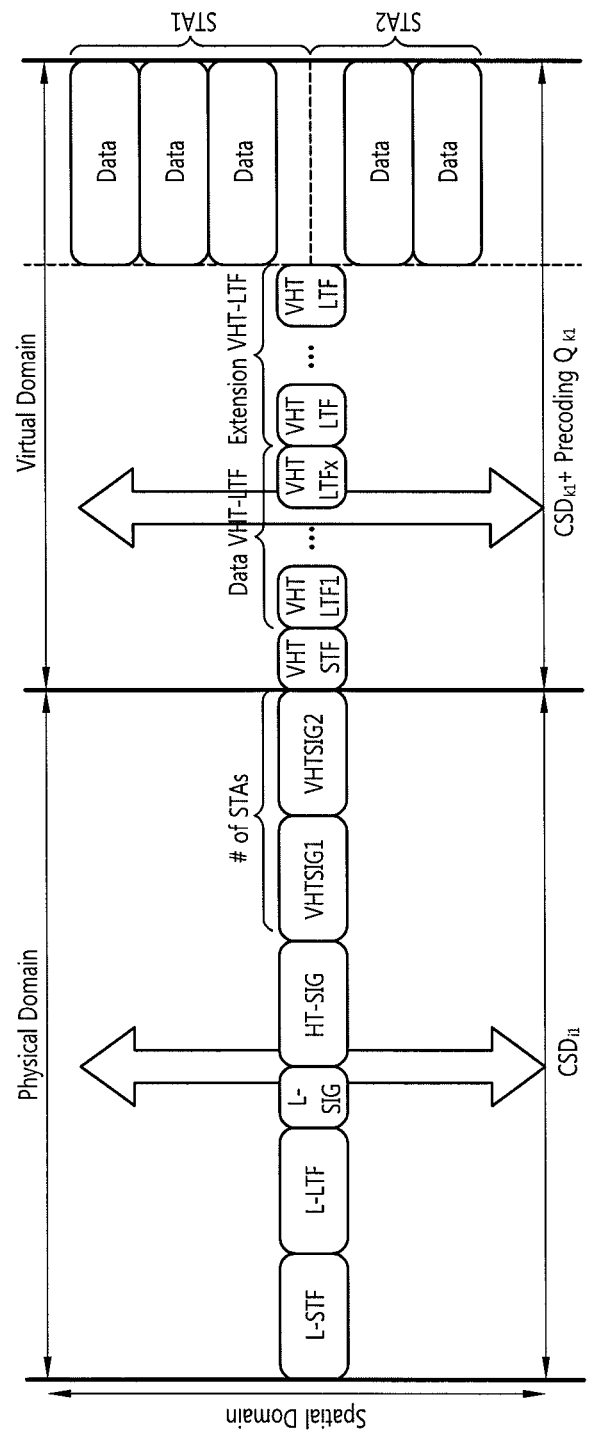

FIG. 28 shows an example of a PLCP frame format according to an embodiment of the present invention.

The PLCP frame of FIG. 28 has a VHT-mixed frame format and includes fields L-STF, L-LTF, L-SIG, and HT-SIG for legacy STAs. The fields L-STF, L-LTF, L-SIG, and HT-SIG have the same function as described above.

FIG. 28 shows the example in which an AP transmits 5 spatial streams to two STAs STA1 and STA2 using the MU-MIMO method, the first STA STA1 receives 3 spatial streams, and the second STA STA2 receives 2 spatial streams. Here, the number of STAs (i.e., targets of MU-MIMO transmission) and the number of spatial streams transmitted to the STAs are only illustrative, and the present invention is not limited thereto.

The PLCP frame of FIG. 28 includes a plurality of VHTSIG fields (e.g., VHTSIG1 and VHTSIG2), each including control information about an STA (i.e., a target of MU-MIMO transmission). That is, the number of VHTSIG fields can be equal to or greater than the number of STAs (i.e., targets of MU-MIMO transmission).

In the example of FIG. 28, the field VHTSIG1 includes control information about the STA1 (i.e., a target of MU-MIMO transmission), and the field VHTSIG2 includes control information about the STA2 (i.e., a target of MU-MIMO transmission).

The VHTSIG field allocated to each STA may consist of several VHTSIG fields, such as VHTSIG1 to the VHTSIGN. For example, the HT-SIG field of the IEEE802.11n standards may include two HT-SIGs, which are transmitted in two OFDM symbols. The number of OFDM symbols of the VHTSIG field to be transmitted can be represented by the number of STAs spatially multiplexed using MU-MIMO and a function of the number of spatially multiplexed streams.

In the example of FIG. 28, the two VHTSIG fields are illustrated, but duration in which the VHTSIG fields are transmitted is increased with an increase in the number of STAs (i.e., targets of MU-MIMO transmission). If an AP transmitting eight streams is operated together with eight 1 Rx-STAs through MU-MIMO, eight VHTSIG fields (i.e., VHTSIG1 to VHTSIG8) have to consecutively transmitted.

In this case, layer index indication, informing which stream will be received by an STA (i.e., a target of MU-MIMO transmission), is required. To this end, the VHTSIG field may include an indication bit, indicating control information for a specific one of STAs (i.e., a plurality of targets of MU-MIMO transmission).

An LTF is subjected to code multiplexing and transmitted through a plurality of spatial streams at the same time. The number of LTFs transmitted may be changed in order to provide LTF orthogonality and thus represented by LTFx in the example of FIG. 28.

A method of adding a unique identification signal for control information about each of the STAs to the VHTSIG field or a method of performing bit pattern masking (i.e., exclusive OR to parity bits) on an identification value, identifying an STA, for the CRC parity bit of the VHTSIG field may be used as a method of indicating where control information for each of STAs (i.e., a plurality of targets of MU-MIMO transmission) is contained in which VHTSIG field may include. In this case, the identification value or signal may be an MAC address or an association ID of a target STA.

A cyclic shift used up to the VHTSIG field can differ from cyclic shifts subsequently used. Fields transmitted after the VHTSIG field can be subjected to precoding and beam-forming and then transmitted.

Figure 29:
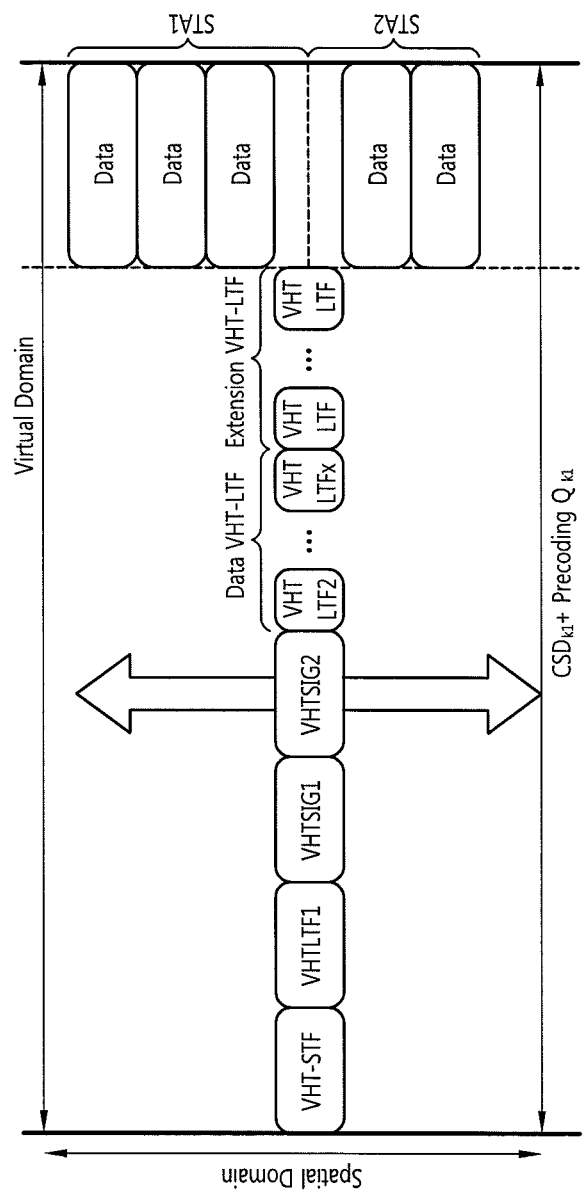

FIG. 29 shows another example of the PLCP frame format according to an embodiment of the present invention. The PLCP frame format of FIG. 29 has a VHT GF PLCP format and it is basically the same as that of FIG. 28. However, since legacy STAs need not to be taken into consideration, fields (e.g., L-STF, L-LTF, L-SIG, and HT-SIG) for the legacy STAs may be omitted, and all fields may be subjected to beam-forming and transmitted.

Figure 30:
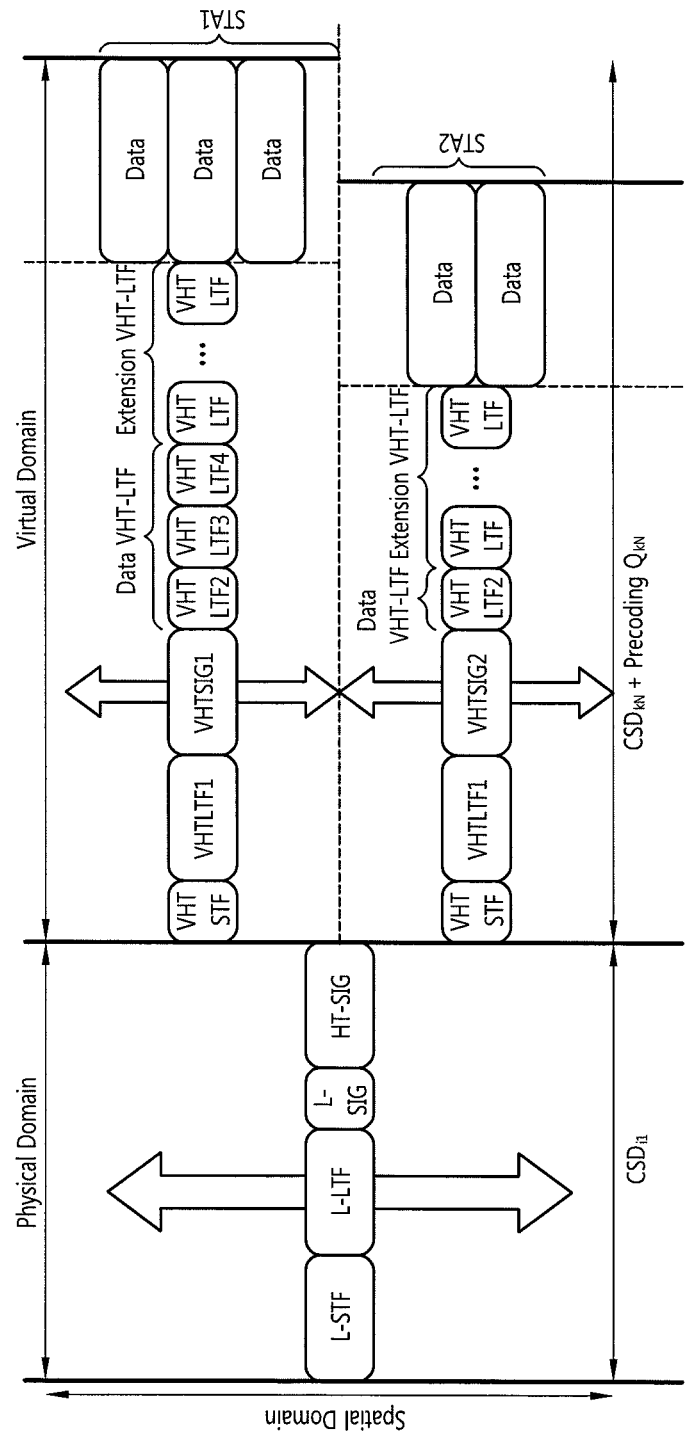
Figure 31:
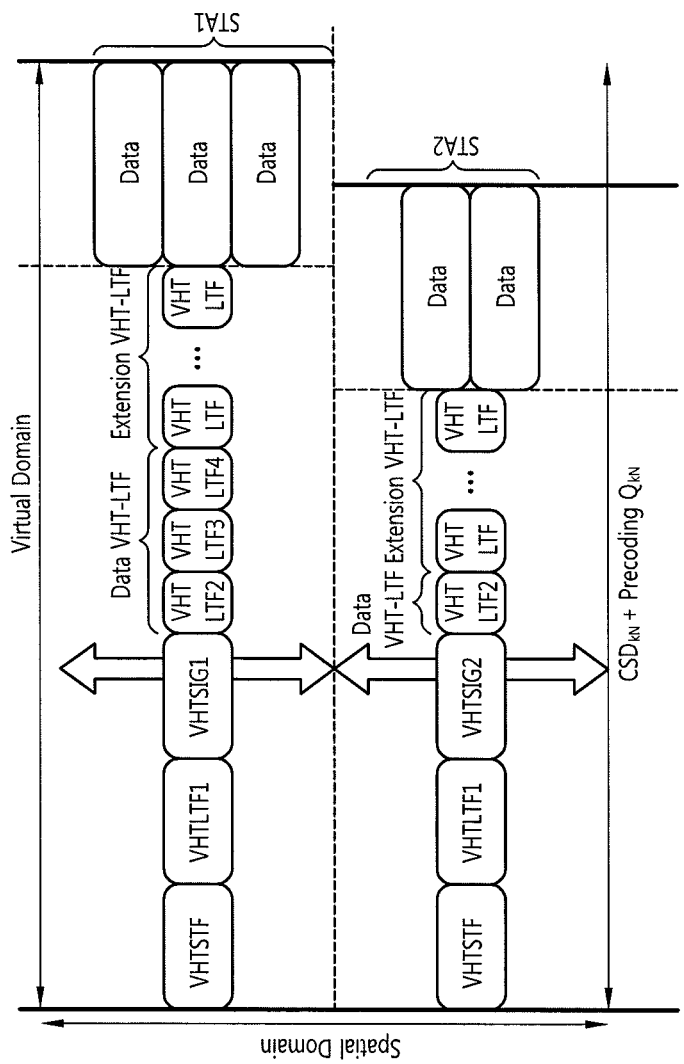

FIGS. 30 and 31 show yet another example of the PLCP frame format according to an embodiment of the present invention.

FIG. 30 shows a VHT-mixed PLCP frame format, and FIG. 31 shows a VHT GF PLCP frame format.

In the PLCP frame of FIG. 30, fields (i.e., L-STF, L-LTF, L-SIG, and HT-SIG) for legacy STAs are transmitted omnidirectionally. Next, subsequent fields starting from VHTSIG fields, each including control information about the STA, can be subjected to beam-forming every STA and then transmitted. Accordingly, in the VHT-mixed PLCP frame format of FIG. 30, the VHTSIG fields are transmitted after fields VHT-STF in each of which an AGC gain has been taken into consideration are transmitted. That is, the field HT-SIG and the fields VHTSIG are not consecutively transmitted.

In case where the VHTSIG fields of FIGS. 28 and 29 support MU-MIMO unlike an overlapped format, the transmission duration of the VHTSIG field is not changed according to the number of STAs. Further, if an AP properly performs beam-forming (e.g., using a block diagonalization scheme) for each STA (i.e., a target of MU-MIMO transmission), the corresponding STA does not interfere with other STAs because it can recognize only its own stream irrespective of a total number of streams. Accordingly, each STA does not know that it is operated according to the MU-MIMO method and considers that it is operated according to the SU-MIMO method using a small number of spatial streams.

FIGS. 30 and 31 show the examples in which an AP pairs two STAs (i.e., STA1 and STA2) for MU-MIMO. The STA1 receives 3 streams and receives 4 VHT-LTFs for channel measurement. The STA2 receives 2 streams and receives 2 VHT-LTFs for channel measurement.

In this case, an LTF mapping matrix P can be represented by Equations 4 to 6.

Equation 4 shows an example of the LTF mapping matrix which may be used when 2 LTFs are measured, Equation 5 shows an example of the LTF mapping matrix which may be used when 3 LTFs are measured, and Equation 6 shows an example of the LTF mapping matrix which may be used when 4 LTFs are measured.

$$P = \begin{bmatrix} 1 & -1 \\ 1 & 1 \end{bmatrix}$$ [Math Figure 4]

$$P = \begin{bmatrix} 1 & -1 & 1 & 1 \\ 1 & 1 & -1 & 1 \\ 1 & 1 & 1 & -1 \end{bmatrix}$$ [Math Figure 5]

$$P = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$ [Math Figure 6]

FIG. 31 shows an example of a VHT GF PLCP frame format. In this frame format, fields for legacy STAs which are non-overlapped parts are omitted in the example of FIG. 30. Further, since all fields are subjected to precoding and beam-forming and then transmitted, the transmission of VHT STF fields for controlling an ACG gain may be omitted.

In the examples of FIGS. 30 and 31, if an AP can transmit 5 or more streams, beams for STAs can be transmitted without interference with each other. However, if a total number of RXs of STAs (i.e., targets of MU-MIMO transmission) is greater than the number of streams that can be received, performance loss can be generated because the beams are not properly formed. For example, it is assumed that when an AP transmits 4 streams, an STA1 has 3 Rx antennas and an STA2 has 2 Rx antennas. Assuming that the AP forms a beam in order to transmit 2 streams to each STA, the STA1 experiences such performance loss.

Here, the performance loss can be caused by various factors. When interference zero forcing beam-forming used by the AP is performed, a transmission signal will not be transmitted to each STA without interference because of the limit of finite word length precision and channel coefficient estimation error. Here, the finite word length precision problem refers to a problem occurring because of information lost when signal information is quantized into digital data in a current wireless modem. Further, in a state in which spatial interference leakage exists, channel estimation can be erroneously performed by LTFs for different STAs composed of the same sequence. Accordingly, performance loss can be generated because data demodulation is not normally performed.

Meanwhile, if LTF indications for the streams of different STAs are included in its own VHTSIG field although interference is introduced from the different STAs (or if indication for its own LTF is included in the VHTSIG field), interference can be cancelled using a proper receiver (e.g., an MMSE receiver). As described above, there is proposed a method of including LTF indications for different STAs except its own STA in the VHTSIG field.

Further, in order to improve the performance of channel estimation in a state in which interference occurs between different STAs because of signals for the different STAs, there is proposed a method of transmitting different sequences to an LTF and other signals (e.g., STF and VHTSIG) through STA-specific scrambling.

As a detailed embodiment, a scrambling code can be generated using the association ID of an STA. In this case, STA-specific scrambling needs not to be necessarily different every STA, and the STAs have only to have different identification classifications for scrambling signals which have been paired through the MU-MIMO method and spatially multiplexed at the same time.

This method can be applied to all schemes constructed by overlapping. Accordingly, if the overlapping scheme is included in all PLCP frame formats subsequently proposed, a pertinent indication can be included in a VHTSIG field, as needed, without special mention, and a combination of fields LTF, STF, and SIG may be scrambled.

The overlapping scheme is advantageous in that it can maintain proper overhead because the symbol duration of the field VHTSIG does not vary according to the number of STAs. A non-overlapping scheme is advantageous in that it can detect necessary spatial streams using all VHT-LTFs which are transmitted on the assumption that STAs paired for MU-MIMO can know their streams allocated thereto. Accordingly, there is proposed a PLCP frame format in which VHTSIGs are transmitted using the overlapping scheme and VHT-LTFs are transmitted using the non-overlapping scheme by making the best use of the advantages.

Figure 32:
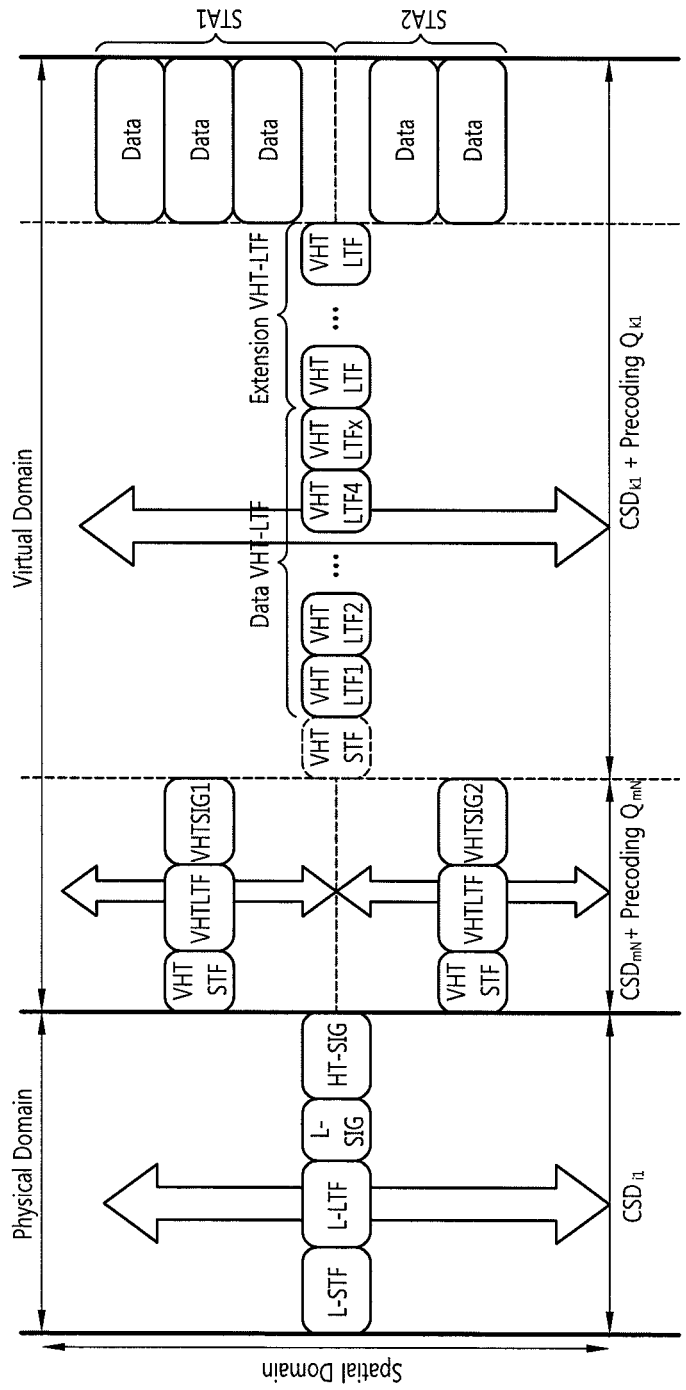
Figure 33:
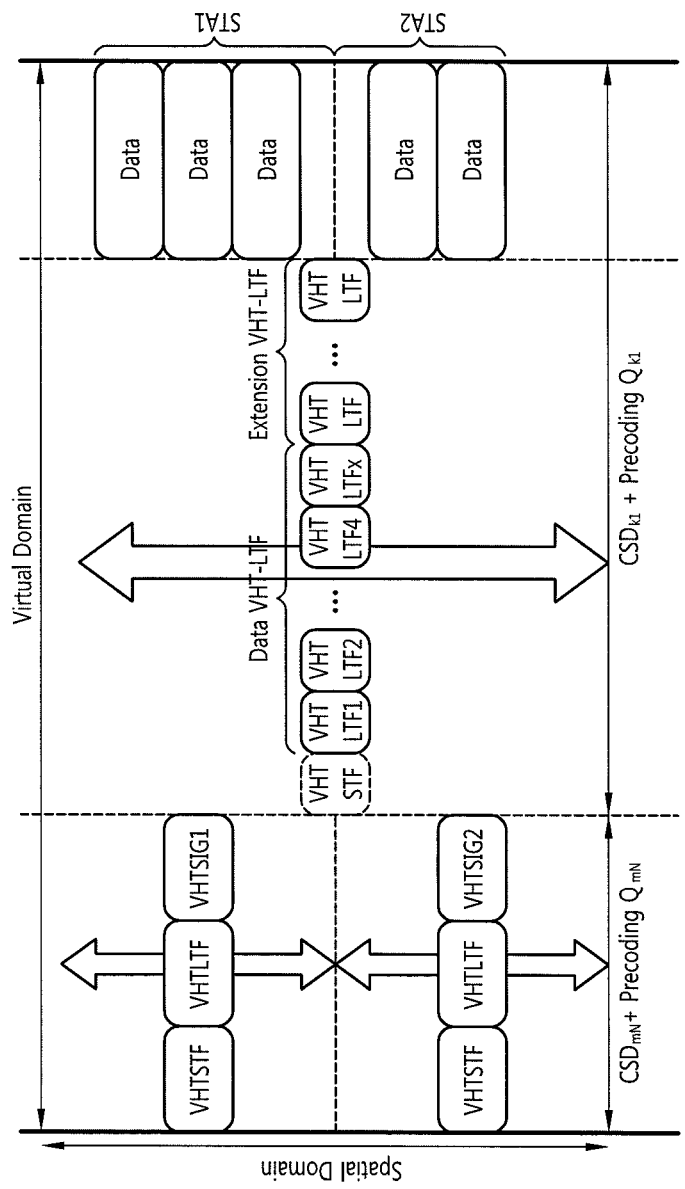
Figure 34:
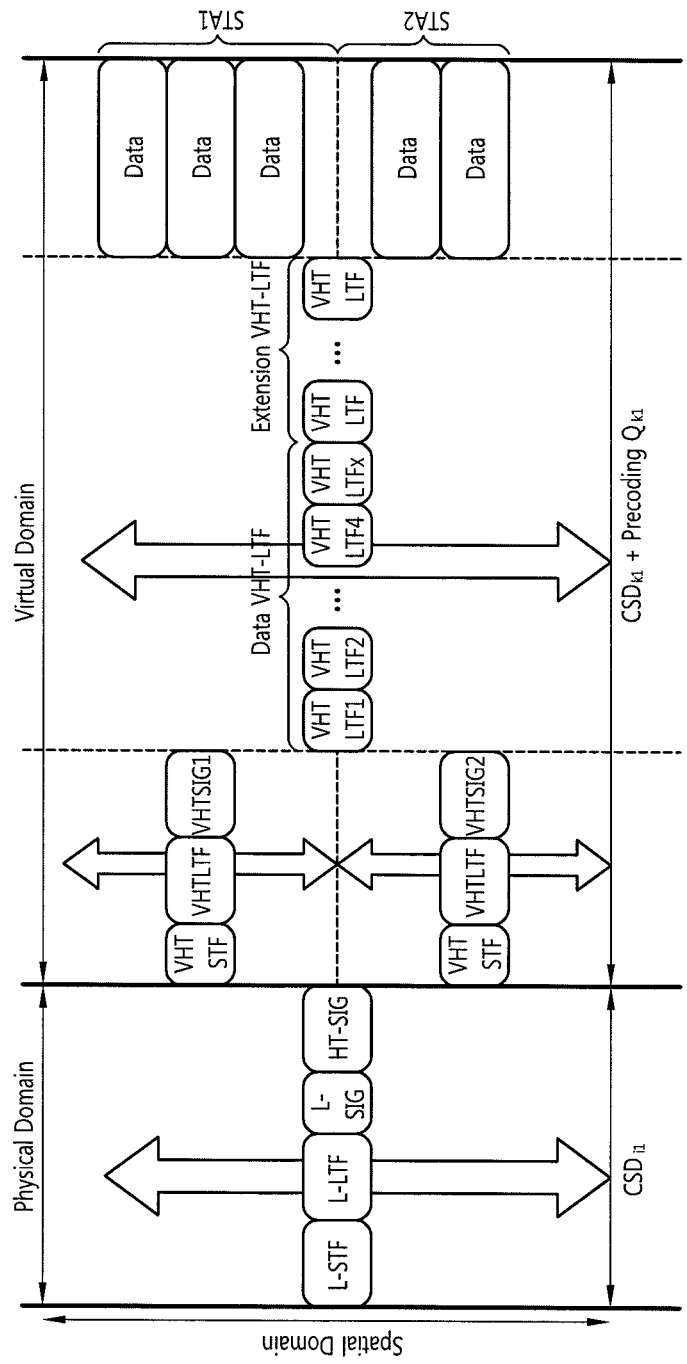
Figure 35:
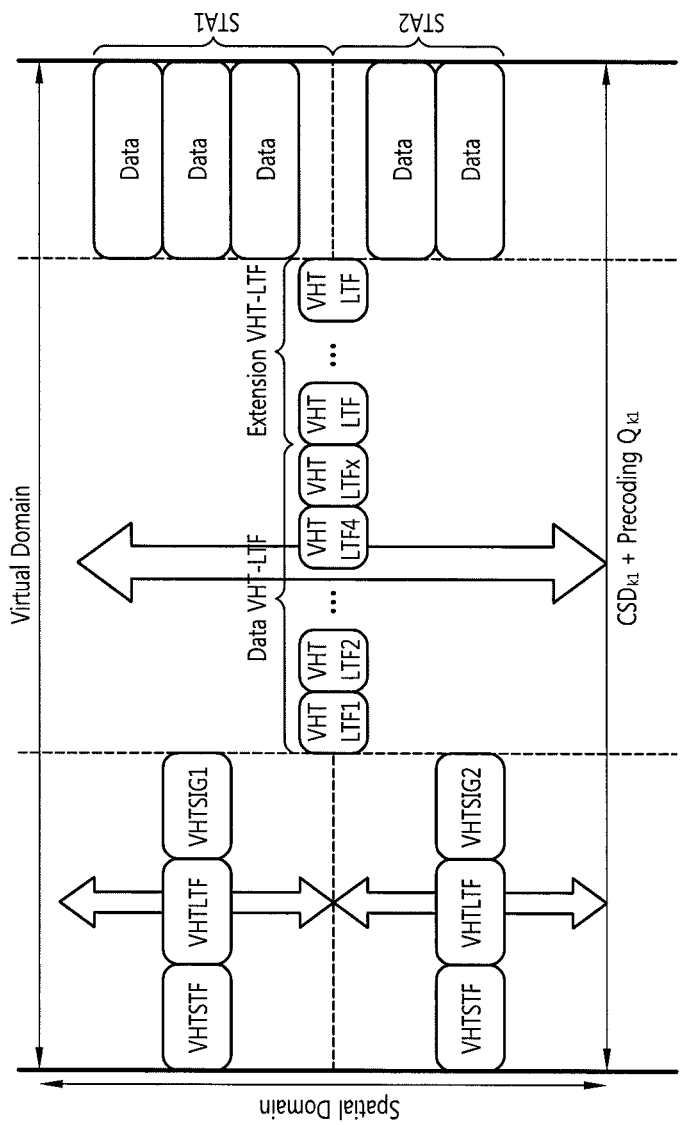

FIGS. 32 to 35 show examples of a PLCP frame format in which VHTSIGs are transmitted using the overlapping scheme and VHT-LTFs are transmitted using the non-overlapping scheme. FIGS. 32 and 33 illustrate cases in which when a beam-forming matrix multiplied to the VHTSIG differs from a beamforming matrix multiplied to the VHT-LFT, a VHT-STF for controlling an AGC gain is required before the VHT-LTFs. FIGS. 34 and 35 show cases in which the VHTSIGs and the VHT-LTFs are subjected to beam-forming using the same beam-forming matrix and transmitted and in which VHT-STFs are not required before the VHT-LTFs are transmitted. FIGS. 32 and 34 show examples of a VHT-mixed PLCP frame format, and FIGS. 33 and 35 show examples of a VHT GF PLCP frame format.

In the examples of FIGS. 32 to 35, it is assumed that one RX antenna is turned on before a reception STA detects the VHTSIG field. The reception STA can know information about its own stream and about a total number of streams by measuring the VHTSIG field using the VHT-LTF and reading the VHTSIG field. Meanwhile, since one antenna is assumed before the VHTSIG field is read, a diversity gain which can be obtained with an increase of the number of RXs may not be used.

Figure 36:
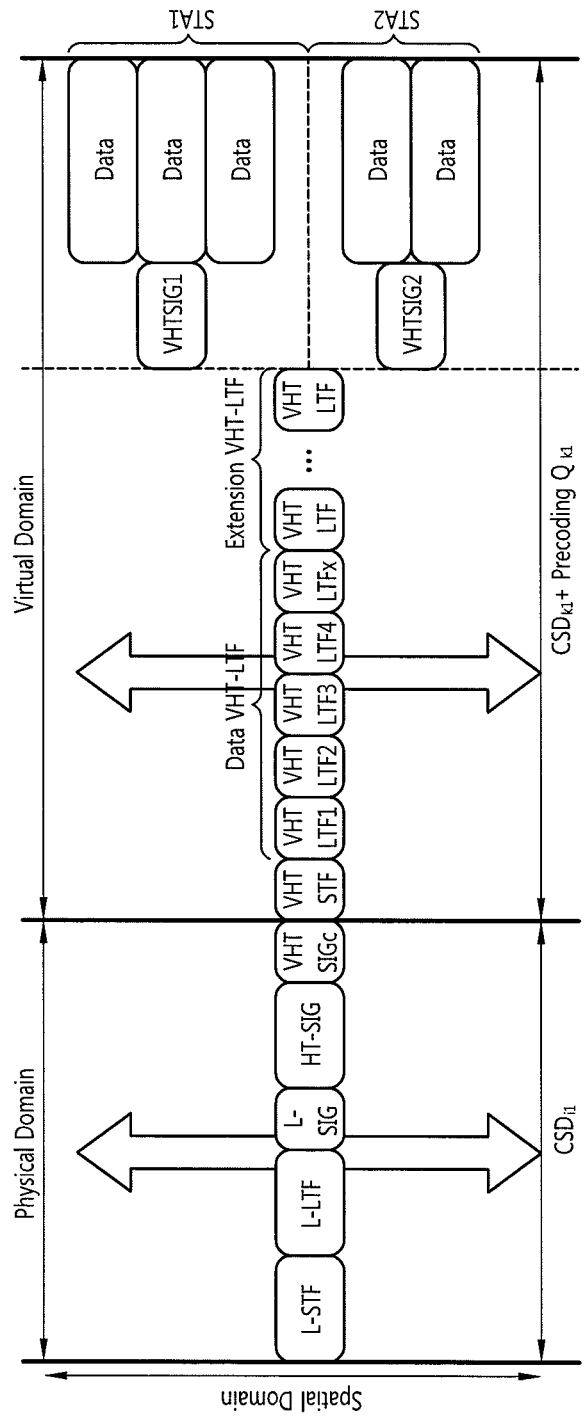
Figure 37:
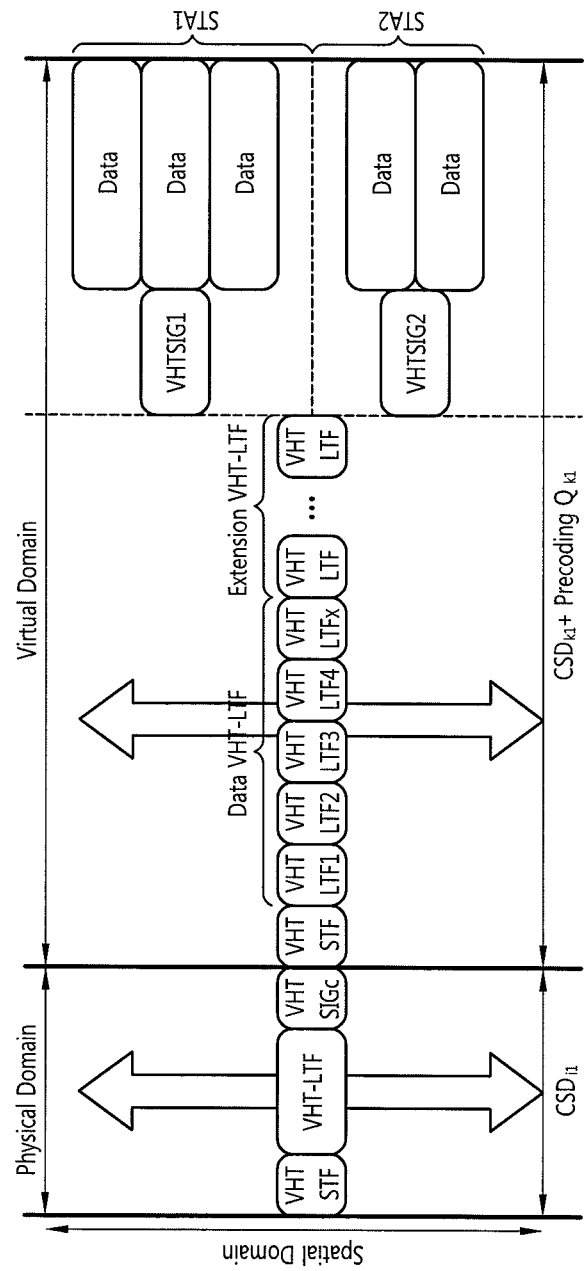

FIGS. 36 and 37 show PLCP frame formats into which a common VHTSIG field has been introduced.

FIG. 36 shows an example of a VHT-mixed PLCP frame format, and FIG. 37 shows an example of a VHT GF PLCP frame format.

The PCLP frame of FIGS. 36 and 37 includes a VHTSIGc field including common control information. The VHTSIGc field is a common VHTSIG field, and it includes common control information about STA1 and STA2. The VHTSIGc field is transmitted onmi-directionally so that all STAs can acquire information about the VHTSIGc field. The VHTSIGc field includes information that all STAs is in common informed, such as information about streams allocated to each STA and a total number of streams, and the information is transmitted to each STA through the VHTSIGc. The fields VHTSIGc and VHT-LTFs are transmitted using the non-overlapping scheme. Next, fields VHTSIG1 and VHTSIG2, each including individualized control information about each STA, are transmitted using the overlapping scheme.

In the above several embodiments, when fields are configured using the overlapping scheme and transmitted to STAs at the same time, a beam must be well formed in the direction of each STA for the purpose of a normal operation and recognized as SU-MIMO from a viewpoint of the STA. In other words, since LTFs in other STAs do not function as interference, the corresponding STA does not need to take whether other STAs exist into consideration.

However, if interference with other STAs is generated for some reasons, it may not be easy to distinguish its own field allocated thereto from fields allocated to other STAs. For example, in the case of the PLCP frame formats of FIGS. 32 to 35, three VHT-LTFs are overlapped with the VHT-LTFs by a P matrix and transmitted to the STA1, and two VHT-LTFs are overlapped with the VHT-LTFs by a p matrix and transmitted to the STA2. In this case, in an 802.11 n system supporting only SU-MIMO, an LTF OFDM symbol is given a fixed pattern consisting of {−1, 1}. Accordingly, the VHT-LTF of the STA1 and the VHT-LTF of the STA2 have OFDM symbols of the same pattern. If an ideal beam is formed, three VHT-LTFs have to be recognized in the STA1 and two VHT-LTFs have to be recognized in the STA2. However, the VHT-LTFs of the STA2 can be detected in the STA1, for some reasons. For example, all the five VHT-LTFs can be recognized in the STA1. In such a case, from a viewpoint of the STA1, there is no method of sorting out VHT-LTFs received through interference if a special indication method is not supported. In order to solve the problem, there is proposed a method of an STA to distinguish its own VHT-LTFs from other VHT-LTFs.

In accordance with an embodiment of the present invention, a scrambling code can be applied to fields, such as LTFs and VHTSIG transmitted to STAs in order to support MU-MIMO. In this case, sequences used in the STAs can be orthogonal to each other, or they should have at least good correlation characteristic. Further, an STA can distinguish its own LTFs or VHTSIG from LTFs or VHTSIGs for other STAs although it receives the LTFs or VHTSIGs for other STAs serving as interference. Accordingly, there is an interference suppression effect. When the scrambling sequence is initialized, an ID (e.g. an Association ID (AID)) which can be replaced with an STA ID or an STA ID, STA temporary numbering or the like can be used. In case where a method using the STA temporary numbering is used, STAs can be numbered, and scrambling sequences can be initialized using the numbered values and then applied to overlapping fields.

Figure 38:
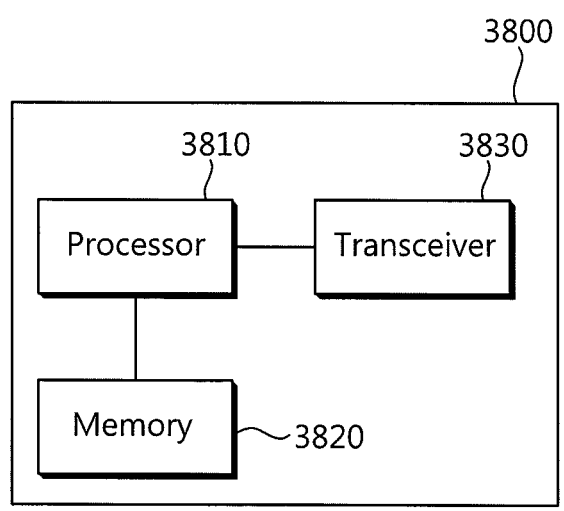
FIG. 38 is a block diagram showing an embodiment of a radio apparatus in which an embodiment of the present invention is implemented.

FIG. 38 is a block diagram showing another example of a radio apparatus in which an embodiment of the present invention is implemented. The radio apparatus 3800 can be an AP or a non-AP station.

The radio apparatus 3800 includes a processor 3810, memory 3820, and a transceiver 3830. The transceiver 3830 transmits and receives a radio signal and has the physical layer of IEEE 802.11 implemented therein. The transceiver 3830 supports MIMO transmission through multiple antennas. The processor 3810 is coupled to the transceiver 3830 and configured to implement the MAC layer and the physical layer of IEEE 802.11. When the processor 3810 processes the operation of a transmission station from among the above methods, the radio apparatus 3800 becomes the transmission station. When the processor 3810 processes the operation of a reception station from among the above methods, the radio apparatus 3800 becomes the reception station.

In the PLCP sublayer of a transmission station implemented in the processor 3810, a PLCP preamble is added to a PSDU, transmitted by the MAC layer, on the basis of the above-described PLCP frame format and then transmitted to the processor 3810 or a PMD sublayer implemented in the transceiver 3830. In the PMD sublayer, the PLCP frame is transmitted through the transceiver 3830 on the basis of a transmission method for each field of the above-described PLCP frame format using a multi-antenna system. In the PLCP sublayer of a reception station implemented in the processor 3810 of the reception station, the PLCP preamble is removed on the basis of the above-described PLCP frame format, and the PSDU is transmitted to the MAC layer implemented in the processor 3810 of the reception station.

The processor 3810 or the transceiver 3830 or both can include an Application-Specific Integrated Circuit (ASIC), other chipset, a logic circuit, and/or a data processor. The memory 3820 can include Read-Only Memory (ROM), Random Access Memory (RAM), flash memory, a memory card, a storage medium and/or other storage device. When the above embodiments are implemented in software, the above schemes can be implemented using a module (or process or function) for performing the above functions. The module can be stored in the memory 3820 and executed by the processor 3810. The memory 3820 can be placed inside or outside the processor 3810 and coupled to the processor 3810 using a variety of well-known means.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of signal transmission in a Wireless Local Area Network (WLAN) system, the method comprising:
generating, by a station, a first very high throughput (VHT) signal containing control information;
generating, by the station, a second VHT signal containing control information; and
transmitting, by the station, the first VHT signal and the second VHT signal, wherein when the second VHT signal is generated for a single target station the second VHT signal is transmitted to the single target station, wherein when the second VHT signal is generated for a plurality of target stations the second VHT signal is transmitted to the plurality of target stations, and wherein the first VHT signal includes an indicator indicating that the second VHT signal is to be transmitted by using a single-user multiple input multiple output (SU-MIMO) scheme or a multi-user multiple input multiple output (MU-MIMO) scheme.

2. The method of claim 1, further comprising:
applying a multi-user multiple input multiple output (MU-MIMO) steering matrix to the second VHT signal to form a pre-coded second control signal.

3. The method of claim 1, wherein the second VHT signal includes a modulation and coding scheme (MCS) index indicating a MCS used in the transmitting step.

4. The method of claim 1, wherein when the second VHT signal is generated for the plurality of target stations the first VHT signal includes a spatial stream identifier indicating a number of spatial streams for each of the plurality of target stations used in the transmitting step.

5. The method of claim 1, wherein the first VHT signal is transmitted over first data subcarriers in each of two orthogonal frequency division multiplexing (OFDM) symbols and the second VHT signal is transmitted over second data subcarriers in one OFDM symbol.

6. The method of claim 5, wherein the number of the first data subcarriers is 48 and the number of the second data subcarriers is 52.

7. The method of claim 1, wherein when the second VHT signal is generated for the plurality of target stations, different scrambling codes are applied to signals transmitted to the plurality of target stations.

8. The method of claim 1, wherein when the second VHT signal is generated for the plurality of target stations an identification value indicating one of the plurality of target stations is included in the first VHT signal or the second VHT signal.

9. The method of claim 1, further comprising:
applying a column matrix to the second VHT signal to form a pre-coded signal, wherein when the second VHT signal is generated for the plurality of target stations a number of row of the column matrix is determined based on a number of spatial streams for each of the plurality of target stations.

10. The method of claim 1, wherein a first cyclic shift is applied to the first WIT signal and a second cyclic shift is applied to the second VHT signal.

11. The method of claim 1, wherein when the second VHT signal is generated for the single target station the first VHT signal indicates a number of spatial streams for the single target station.

12. The method of claim 1, wherein when the second VHT signal is generated for the plurality of target stations, the first VHT signal indicates a total number of spatial streams for the plurality of target stations.

13. The method of claim 1, wherein the first control signal includes indication information indicating at least one spatial stream of another target station.

14. The method of claim 13, wherein the indication information is used to reduce interference caused by the at least one spatial stream of another target station.

15. A radio apparatus for signal transmission in a Wireless Local Area Network (WLAN) system, the radio apparatus comprising:
a processor configured to:
generate a first very high throughput (VHT) signal containing control information; and
generate a second VHT signal containing control information; and
a transceiver configured to:
transmit the first VHT signal and the second VHT signal, wherein when the second VHT signal is generated for a single target station the second VHT signal is transmitted to the single target station, wherein when the second VHT signal is generated for a plurality of target stations the second VHT signal is transmitted to the plurality of target stations, and wherein the first VHT signal includes an indicator indicating that the second VHT signal is to be transmitted by using a single-user multiple input multiple output (SU-MIMO) scheme or a multi-user multiple input multiple output (MU-MIMO) scheme.

16. The radio apparatus of claim 15, wherein the processor is configured to apply a multi-user multiple input multiple output (MU-MIMO) steering matrix to the second VHT signal to form a pre-coded second control signal.

17. The radio apparatus of claim 15, wherein the second VHT signal includes a modulation and coding scheme (MCS) index indicating a MCS used in the transmission of the first VHT signal and the second VHT signal.

18. The radio apparatus of claim 15, wherein when the second VHT signal is generated for the plurality of target stations the first VHT signal includes a spatial stream identifier indicating a number of spatial streams for each of the plurality of target stations used in the transmission of the first VHT signal and the second VHT signal.

19. The radio apparatus of claim 15, wherein the first VHT signal is transmitted over first data subcarriers in each of two orthogonal frequency division multiplexing (OFDM) symbols and the second VHT signal is transmitted over second data subcarriers in one OFDM symbol.

20. The radio apparatus of claim 19, wherein the number of the first data subcarriers is 48 and the number of the second data subcarriers is 52.

21. The radio apparatus of claim 15, wherein when the second VHT signal is generated for the plurality of target stations, different scrambling codes are applied to signals transmitted to the plurality of target stations.

22. The radio apparatus of claim 15, wherein when the second VHT signal is generated for the plurality of target stations an identification value indicating one of the plurality of target stations is included in the first VHT signal or the second VHT signal.

23. The radio apparatus of claim 15, wherein the processor is further configured to apply a column matrix to the second VHT signal to form a pre-coded signal, wherein when the second VHT signal is generated for the plurality of target stations a number of row of the column matrix is determined based on a number of spatial streams for each of the plurality of target stations.

24. The radio apparatus of claim 15, wherein a first cyclic shift is applied to the first VHT signal and a second cyclic shift is applied to the second VHT signal.

25. The radio apparatus of claim 15, wherein when the second VHT signal is generated for the single target station the first VHT signal indicates a number of spatial streams for the single target station.

26. The radio apparatus of claim 15, wherein when the second VHT signal is generated for the plurality of target stations, the VHT signal indicates a total number of spatial streams for the plurality of target stations.

27. The radio apparatus of claim 15, wherein the first control signal includes indication information indicating at least one spatial stream of another target station.

28. The radio apparatus of claim 27, wherein the indication information is used to reduce interference caused by the at least one spatial stream of another target station.

29. A radio apparatus for signal transmission in a Wireless Local Area Network (WLAN) system, the radio apparatus comprising:
a means for:
generating a first very high throughput (VHT) signal containing control information; and
generating, by he station, a second VHT signal containing control information; and
a means for transmitting the first VHT signal and the second VHT signal, wherein when the second VHT signal is generated for a single target station the second VHT signal is transmitted to the single target station, wherein when the second VHT signal is generated for a plurality of target stations the second VHT signal is transmitted to the plurality of target stations, and wherein the first VHT signal includes an indicator indicating that the second VHT signal is to be transmitted by using a single-user multiple input multiple output (SU-MIMO) scheme or a multi-user multiple input multiple output (MU-MIMO) scheme.

30. The radio apparatus of claim 29, further comprising:
applying a multi-user multiple input multiple output (MU-MIMO) steering matrix to the second VHT signal to form a pre-coded second control signal.

31. The radio apparatus of claim 29, wherein the first VHT signal is transmitted over first data subcarriers in each of two orthogonal frequency division multiplexing (OFDM) symbols and the second VHT signal is transmitted over second data subcarriers in one OFDM symbol.

32. The radio apparatus of claim 29, wherein when the second VHT signal is generated for the plurality of target stations, different scrambling codes are applied to signals transmitted to the plurality of target stations.

33. The radio apparatus of claim 29, wherein when the second VHT signal is generated for the plurality of target stations an identification value indicating one of the plurality of target stations is included in the first VHT signal or the second VHT signal.

34. The radio apparatus of claim 29, wherein a first cyclic shift is applied to the first VHT signal and a second cyclic shift is applied to the second VHT signal.

35. The radio apparatus of claim 29, wherein when the second VHT signal is generated for the single target station the first VHT signal indicates a number of spatial streams for the single target station.

36. The radio apparatus of claim 29, wherein when the second VHT signal is generated for the plurality of target stations, the first VHT signal indicates a total number of spatial streams for the plurality of target stations.

37. The radio apparatus of claim 29, wherein the first control signal includes indication information indicating at least one spatial stream of another target station.

38. The radio apparatus of claim 37, wherein the indication information is used to reduce interference caused by the at least one spatial stream of another target station.

* * * * *